US010743036B1

(12) United States Patent
Farris et al.

(10) Patent No.: US 10,743,036 B1
(45) Date of Patent: Aug. 11, 2020

(54) AUTOMATICALLY AUGMENTING USER RESOURCES DEDICATED TO SERVING CONTENT TO A CONTENT DELIVERY NETWORK

(71) Applicant: Amazon Technologies, Inc., Seattle, WA (US)

(72) Inventors: Ryan Farris, Bellevue, WA (US); Prashant Verma, Seattle, WA (US); Ronil Sudhir Mokashi, Mercer Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 13 days.

(21) Appl. No.: 15/993,466

(22) Filed: May 30, 2018

(51) Int. Cl.
*H04N 21/231* (2011.01)
*H04N 21/25* (2011.01)
*H04N 21/235* (2011.01)

(52) U.S. Cl.
CPC ... *H04N 21/23106* (2013.01); *H04N 21/2353* (2013.01); *H04N 21/251* (2013.01)

(58) Field of Classification Search
CPC ............. H04L 63/1425; H04L 63/1408; H04L 63/1433; H04L 43/0882; H04L 47/824; H04L 47/803; H04L 67/025
See application file for complete search history.

(56) References Cited

U.S. PATENT DOCUMENTS

| | | | | |
|---|---|---|---|---|
| 2001/0056500 | A1* | 12/2001 | Farber | G06F 9/505 709/245 |
| 2012/0179825 | A1* | 7/2012 | Dhoolia | G06F 15/16 709/226 |
| 2013/0159472 | A1* | 6/2013 | Newton | H04L 67/2852 709/219 |
| 2017/0111233 | A1* | 4/2017 | Kokkula | H04L 41/0823 |

\* cited by examiner

*Primary Examiner* — Junior O Mendoza

(74) *Attorney, Agent, or Firm* — Quarles & Brady LLP

(57) ABSTRACT

In some embodiments, a system is provided, and computer-executable instructions cause the system to: receive, at an edge server of a content delivery network (CDN), a request for a first video and a request for a second video; determine that the first video is not cached and that the second video is cached; request the first video from the origin server and log a cache miss; obtain the first video from the origin server and send responsive to the request; send the second video responsive to the request and log a cache hit; obtain a metric indicative of the volume of cache misses, including for the first and second videos, across edge servers of the CDN; and determine, based on the metric, an amount by which to scale resources implementing the origin.

20 Claims, 13 Drawing Sheets

AUTOMATICALLY AUGMENTING USER RESOURCES DEDICATED TO SERVING CONTENT TO A CONTENT DELIVERY NETWORK

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

A service provider can use the physical computing resources of data centers to implement a computing environment that receives connections from remote computing devices over one or more communication networks, such as the Internet. Security services can control these connections, and the service provider can make various remote computing services available to authorized users of connected devices. Content delivery networks are widely used examples of such remote computing services. Some computing resource service providers offer a network or networks of servers (which can include physical and/or virtual servers) that are configured to store one or more cached versions of content made available by a content provider to increase the speed and/or reliability of content delivery. Certain groups of users can particularly benefit from services provided by content delivery networks. For example, a company or another type of organization can maintain and/or generate large amounts of high bandwidth and/or frequently requested content, such as a provider of video on demand content. Through the use of one or more content delivery networks, content can be delivered to end users at higher quality and/or more reliably.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
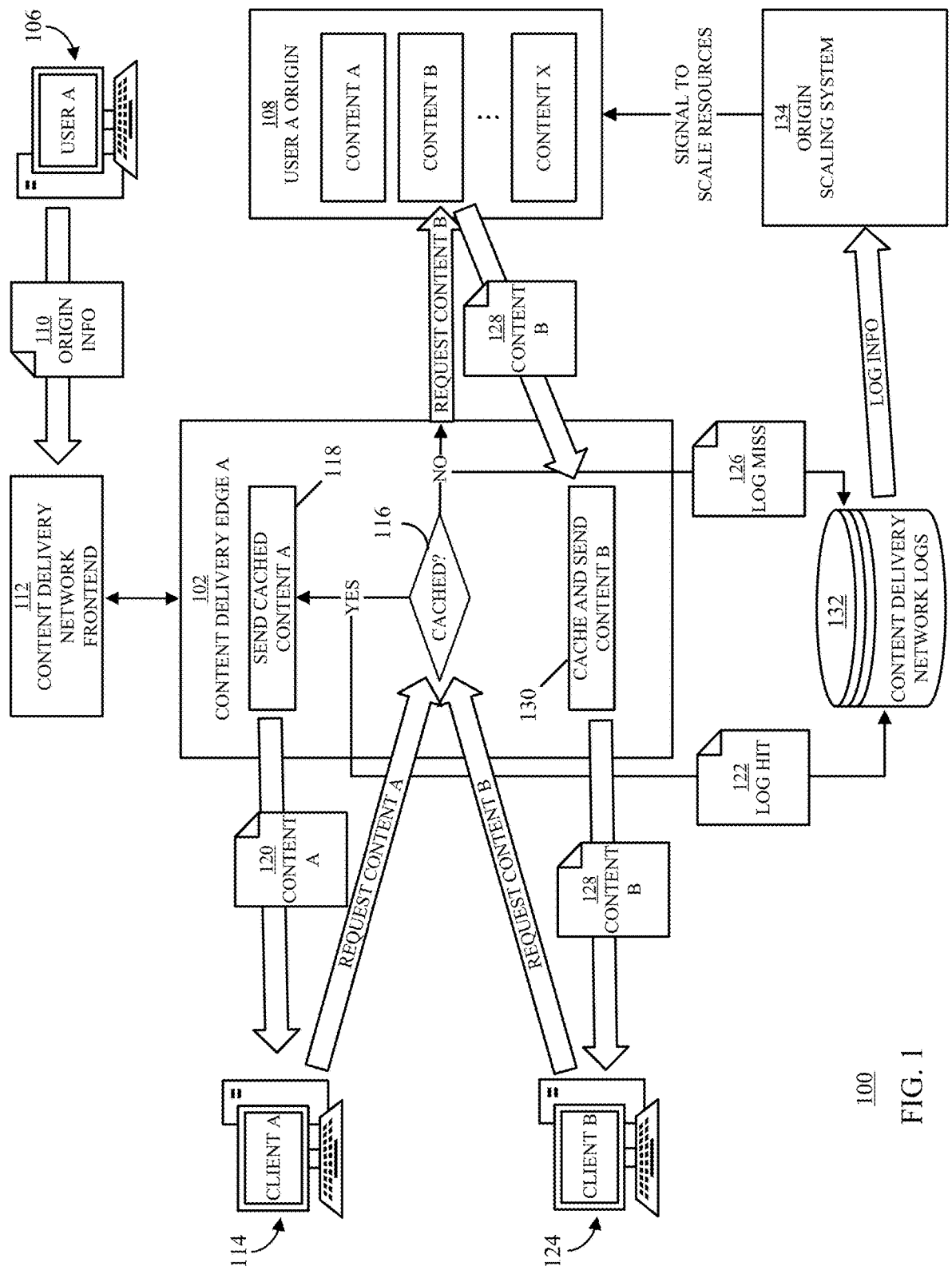
FIG. 1 is an example of a system for automatically augmenting user resources dedicated to serving content to a content delivery network in accordance with some embodiments of the disclosed subject matter.

In the following description, various embodiments will be described. For purposes of explanation, specific configurations and details are set forth in order to provide a thorough understanding of the embodiments. However, it will also be apparent to one skilled in the art that the embodiments can be practiced without the specific details. Furthermore, well-known features may be omitted or simplified in order not to obscure the embodiments being described.

Mechanisms described herein relate to protecting a customer's origin when an unexpected increase in cache misses occurs at edges of a content delivery network. A computing resource service provider, such as a company or other organization, can operate computing resources to provide a content delivery network that can increase the reliability and/or performance of content delivery. For example, the computing resource service provider can maintain servers (sometimes referred to as edge servers) in various geographical locations, and the edge servers can cache content received from an origin server designated by the customer such that further requests for that same content from the same geographic region can be served without involvement by the origin server. In some cases, a customer can be charged for use of the content delivery network, such that the customer's costs are proportional to the amount of content being delivered, while end users can reliably access the content. By contrast, if a customer were to serve all requests from the origin server(s), the customer would generally allocate a particular amount of compute resources to serving the content. In such an example, in order to ensure that content is reliably delivered when there are surges in requests for the content, the customer may choose to allocate more resources than are needed to reliably deliver content when an average amount of requests are being received, which can be costly. Alternatively, when there are surges in requests for the content, the origin server(s) may be incapable of reliably serving content in response to all of the request, which can result in end users experiencing lag or errors.

Through the use of a content delivery network, requests to the origin server can be reduced, allowing the customer to dedicate less resources to the origin server, potentially saving the customer money that would otherwise be used to maintain more robust infrastructure for delivering content. However, when the amount of requests for content hosted by the origin server surges, or when there is an error (e.g., an error recognizing that requested content is cached), requests to the origin can increase beyond the capacity of the origin to respond. For example, if requests for a particular content item rapidly increases (sometimes colloquially referred to as the content "going viral"), edges of the content delivery network may experience more cache misses (e.g., when the version of the content item that is cached has expired) and/or may be unable to respond to all requests due to the volume of requests being received (e.g., the rate at which requests are being received, and/or the absolute number of requests being received within a particular time period), which can cause the edges to increase the amount of requests submitted to the origin server, which can result in degraded performance and/or a worse experience for end users. One conventional approach for managing an increase in requests for content from a particular user of a content delivery network is to add another caching layer between the edges of the content delivery network and the user's origin through which requests for content are routed to the origin. In such an approach, because the extra caching layer receives requests that would otherwise be sent to the origin server, the extra caching layer is more likely to have a cached version of the content being requested by a particular edge server. This extra caching layer than can reduce the amount of requests that are ultimately sent to the origin server. However, this approach requires the user to pay for the extra layer at all times, even when it may be unnecessary. It can also add an extra potential point of failure, as the extra layer may be ineffective in certain situations in which it would be more advantageous to provide a more robust origin, such as if the extra layer is down for maintenance, or if there is an error at the extra layer that causes more requests to be sent to the origin.

In accordance with some embodiments of the disclosed subject matter, mechanisms (which can include systems, methods, and/or computer-readable media) for automatically augmenting the amount of resources dedicated to serving content to a content delivery network can be provided. In some embodiments, the mechanisms described herein can receive information derived from logs generated by the content delivery network when requests are received at edges of the content delivery network. For example, when an edge receives a request for content, the edge can determine whether the content is currently cached by the edge, and if so, whether the cached content is expired. If the edge determines that the content is cached and not expired, the edge can generate log information indicating that the requested content was cached. However, if the edge has to receive the requested content from the origin, the edge can generate log information indicating that the requested content was not cached. In some embodiments, aggregated information about how often requested content is already cached at an edge that received the request can be used to infer whether the origin server is capable of responding to requests for content.

In some embodiments, the mechanisms described herein can analyze the rates at which requested content is, and/or is not, cached to determine whether more resources should be dedicated to serving content to edges of the content delivery network. For example, if the rate at which requested content is not cached increases (and/or the average number of requests for content to the origin server increases), the mechanisms described herein can determine that the origin server does not have enough compute resources to respond to the increase in requests. In such embodiments, the mechanisms described herein can send instructions to a service being used by the customer to provide computing resources used to implement the origin server that cause the service to scale up the amount of resources dedicated to acting as the origin server.

In some embodiments, the mechanisms described herein can use machine learning techniques to predict when requests from the edges of the content delivery network are likely to increase in the near future (e.g., within the next five minutes, one hour, etc.). For example, in some embodiments, the mechanisms described herein can train a machine learning model using metadata associated with content items being hosted (or otherwise made available) by the origin server associated with the customer, metadata associated with content items being hosted (or otherwise made available) by the origin server associated with other customers, metadata associated with the customer and/or an author(s) of the content, and/or metadata associated with how often requested content is not cached when an edge receives the request. In such an example, the machine learning model can be trained to produce an output indicative of the likelihood that the number of cache misses will increase in the near future. In some embodiments, this information can be used to determine when the resources dedicated to serving content to the edges of the content delivery network should be automatically scaled up.

FIG. 1 depicts an example of a system 100 for automatically augmenting user resources dedicated to serving content to a content delivery network in accordance with some embodiments of the disclosed subject matter. As shown in FIG. 1, in some embodiments, system 100 can include a content delivery edge 102 (labeled content delivery edge A in FIG. 1 for convenience) that is part of a content delivery network for delivering content hosted by an origin server 104 associated with a user (e.g., User A in FIG. 1). In some embodiments, physical compute resources implementing content delivery edge 102 can be located in a particular geographic location, and can be connected to a wide area network (e.g., the Internet) via one or more communication links and/or communication networks (e.g., as described below in connection with FIG. 10).

In some embodiments, system 100 can include compute resources 106 associated with a particular user (e.g., "user A") of a content delivery service associated with content delivery edge 102. In some such embodiments, the user can be a person (e.g., a developer, a website administrator, an application administrator, etc.) and/or an entity (e.g., a corporation, a non-profit organization, etc.). Additionally, in some embodiments, compute resources 106 can act programmatically to perform one or more actions. Although shown and described as resources provided through a compute service, compute resources 106 can be any suitable computing device or combination of computing devices. For example, compute resources 106 can include physical computing devices associated with a user that are not provided through the compute service (e.g., a personal computer, a laptop computer, a server, a smartphone, a tablet computer, a wearable computer, etc.), virtual computing devices provided through a compute service associated with the same service provider that is associated with the content delivery service, and/or through a different platform (e.g., a different compute service). Additionally, in some embodiments, actions described herein as being performed by compute resources 106 can be performed by one or more virtual machines that are provided within compute resources 106 by a compute service in connection with compute resources 106, one or more physical computing devices associated with the compute service (e.g., infrastructure for providing the compute service), one or more other computing devices authorized to act on behalf of the user associated with compute resources 106 (e.g., based on credentials, a certificate, etc.).

In some embodiments, compute resources 106 can include a be part of a network which can include one or more physical networks (e.g., which can be owned and/or operated by the user associated with compute resources 106) and/or one or more virtual networks (e.g., which can be provided by physical computing devices made available by a service provider) including compute resources made available to the user through a compute service. For example, the network can include any suitable number of virtual machines that can be arranged in a network for performing one or more actions (e.g., providing access to web pages, media content, applications, services, a database, etc.). As another example, the network can include compute resources that are available to the user as a service, such as an electronic data storage service, a network-accessible services system that can perform one or more on-demand functions, load balancing services, database management services, etc. In some embodiments, the network can include compute resources provided by a single physical computing device, by a single data center, by a group of interconnected data centers (e.g., connected by low latency communication links), by groups of interconnected data centers that are not directly connected to other groups of data centers (but that may be connected via a wide area network, such as the Internet). Additionally, in some embodiments, the network can be organized into different subnets, some of which may be physically and/or logically isolated from one another.

In some embodiments, user A can be associated with an origin server 108 that can be used by the user to provide access to content, such as downloadable media content (e.g., video, audio, images, text, etc.), streaming media content (e.g., streaming video, streaming audio), on-demand media content (e.g., video on demand (VOD) content), downloadable and/or web applications, web pages or portions of web pages (e.g., including text, graphics, scripts, etc.), etc. In some embodiments, origin server 108 can be implemented using one or more physical servers and/or virtual compute resources. For example, in some embodiments, origin server 108 can be implemented using one or more physical HTTP servers maintained by user A. As another example, in some embodiments, origin server 108 can be implemented as virtual data storage through an electronic data storage service. In some embodiments, origin server 108 can be implemented using resources provisioned as described below in connection with FIGS. 11 and 12. As yet another example, origin server 108 can be implemented using one or more virtual machines (e.g., provided via a compute service). In such an example, multiple virtual machines can collectively act as origin server 108 and/or can act as replicas of origin server 108 among which requests for content from origin server 108 can be distributed (e.g., via a load balancing service).

In some embodiments, user A can specify the location and identifying information of content to be served by the content delivery network including content delivery edge 102 by providing origin information 110 indicating which origin server (e.g., specifying origin server 108 and/or another origin server) the content delivery network is to request each item of content to be served through the content delivery network. For example, in some embodiments, content can be specified by an Internet Protocol (IP address) at which the content is to be made available, which can be in a domain assigned by the content delivery network, or through origin information 110 submitted by user A. The content can also be specified based on the origin server that the content delivery server is to retrieve the content from when it is requested by a client device. In such an example, user A can assign an IP address within the specified domain to each item of content to be served by the content delivery network. In some embodiments, compute resources 106 can submit origin information 110 to the content delivery network via a content delivery network frontend 112 (e.g., via one or more communication networks, such as the Internet). In some embodiments, origin information 110 can be sent in any suitable format or combination of formats. For example, in some embodiments, origin information 110 can be an Extensible Markup Language (XML) document that specifies one or more origin servers (e.g., based on a domain of a URL included in origin information 110), one or more content items (e.g., based on a domain and/or a path of a URL included in origin information 110), etc. As another example, in some embodiments, origin information 110 can be a JavaScript Object Notation (JSON) document that specifies one or more origin servers (e.g., based on a domain of a URL included in origin information 110), one or more content items (e.g., based on a domain and/or a path of a URL included in origin information 110), etc.

In some embodiments, frontend 112 can serve as a "front door" to subsystems of the content delivery network. For example, frontend 112 can process messages including origin information (e.g., origin information 110) received from various computing devices (e.g., compute resources 106), and can determine whether the information is properly authorized (e.g., whether user A of compute resources 106 is authorized to modify the services provided by the content delivery network). In some embodiments, frontend 112 can include one or more web servers configured to expose one or more application program interfaces (APIs) that can receive messages from one or more computing devices (e.g., compute resources 106) as API calls. In some embodiments, frontend 112 can extract requests from the API call and write them to a data store associated with the content delivery network. For example, compute resources 106 can call the API to submit updated and/or new origin information 110, to access a control interface that includes user input prompts for submitting updated and/or new origin information 110, to change the expiration time (e.g., a time after which the content delivery network is to determine whether cached content has been updated) for one or more types of content to be delivered by the content delivery network, etc. Note that although origin information 110 is shown as being sent by compute resources 106 associated with user A, this is merely an example, and origin information 110 can also be provided by other compute resources utilized by user A. For example, a video processing service (e.g., as described below in connection with FIG. 3) can transcode an original version of a media content item into various different versions of the media content item that are each stored by the video processing service. In such an example, the video processing service can provide origin information 110 to the content delivery network (e.g., via frontend 112).

In some embodiments, the content delivery network can provide at least a portion of origin information 110 to each content delivery edge (e.g., including content delivery edge 102) through which the user's content is to be delivered to clients. For example, in some embodiments, frontend 112 can distribute a copy of origin information 110 to each content delivery edge.

In some embodiments, a client device 114 can request a content item (e.g., content item A) by requesting content associated with a particular IP address specified by user A. For example, user A can provide a hyperlink to the content item through a web page and/or application associated with user A. As described above, in some embodiments, the IP address can be within a domain specified by the content delivery network. Note that, although a user associated with compute resources 106 is sometimes referred to as user A, and client device 114 is sometimes referred to as client A, this is not intended to imply that the same user is associated with both compute resources 106 and client device 114 (although this is of course a possibility).

In some embodiments, when client device 114 requests content from the IP address associated with content item A, a domain name system (DNS) server can direct the request to a content delivery network edge that is best able to serve the request (e.g., the content delivery network edge that has the lowest latency to the requesting client device).

In the example shown in FIG. 1, the request for content item A from client 114 is sent to content delivery edge 102. In some embodiments, at 116, content delivery edge 102 can determine whether content requested by a client device (e.g., content item A requested by client device 114) is cached at content delivery edge 102. If content delivery edge 102 determines that the requested content is cached at content delivery edge 102 ("YES" at 116), at 118 content delivery edge 102 can send cached content item A 120 to client deice 114. Additionally, in some embodiments, if content delivery edge 102 determines that the requested content is cached at content delivery edge 102 ("YES" at 116), content delivery edge 102 can send log information 122 indicating that the requested content was cached (e.g., log information 122 can correspond to a cache "hit").

In some embodiments, prior to sending cached content item A at 118, content delivery edge 102 can determine whether the cached content has expired (e.g., whether the lifetime of the content has elapsed). For example, if content item A has a lifetime of 24 hours, content delivery edge 102 can determine whether cached content item A was last updated more than 24 hours ago. If content delivery edge 102 determines that the cached content has expired, content delivery edge 102 can query the origin server (e.g., origin server 108) from which cached content item A was received to determine whether the content has been updated. For example, content delivery edge 102 can send a message to the origin server with identifying information of the content and/or version information, which the origin server can use to determine whether the cached content is up to date. If the content is not up to date, the origin server can respond to the message with the updated content. In some embodiments, a request sent to the origin to verify whether expired cached content is a current version of the content can be counted as a cache hit if the cached version of the content is the current version, while the request can be counted as a cache miss (e.g., as described below in connection with log information 126) if the current version is not the current version and the origin sends the current version after receiving the request to verify whether the expired content is a current version.

In some embodiments, a client device 124 can request a different content item (e.g., content item B) by requesting content associated with a particular IP address specified by user A. For example, user A can provide a hyperlink to content item B through a web page and/or application associated with user A. As described above, in some embodiments, the IP address can be within a domain specified by the content delivery network.

As described above in connection with client device 114, in some embodiments, when client device 124 requests content from the IP address associated with content item B a DNS server can direct the request to a content delivery network edge that is best able to serve the request (e.g., the content delivery network edge that has the lowest latency to the requesting client device).

In the example shown in FIG. 1, the request for content item B from client device 124 is sent to content delivery edge 102. In some embodiments, at 116, content delivery edge 102 can determine whether a content item requested by a client device (e.g., content B requested by client device 122) is cached at content delivery edge 102. If content delivery edge 102 determines that the requested content is not cached at content delivery edge 102 ("NO" at 116), content delivery edge 102 can send a request for content B to origin server 108 based on origin information 110 received from compute resources 106 (e.g., via frontend 112). Additionally, in some embodiments, if content delivery edge 102 determines that the requested content is not cached at content delivery edge 102 ("NO" at 116), content delivery edge 102 can send log information 126 indicating that the requested content was not cached (e.g., log information 126 can correspond to a cache "miss").

In some embodiments, in response to the request for content item B from content delivery edge A, origin server 108 can return content item 128, which content delivery edge 102 can receive and, at 130, begin both caching content item 128 and sending content item 128 to client device 124 in response to the request for content item 128 from client device 124.

As shown in FIG. 1, log information (e.g., log information 122 corresponding to a cache hit, and log information 126 corresponding to a cache miss) can be sent to a content delivery network log repository 132. In some embodiments, when log information is sent by a content delivery edge (e.g., content delivery edge 102), the log information can be stored in in content delivery network log repository 132. In some embodiments, content delivery network log repository 132 can be implemented using any suitable hardware and/or software. For example, in some embodiments, content delivery network log repository 132 can be implemented as a database (e.g., a non-relational database, a relational database). As another example, content delivery network log repository 132 can be implemented as an electronic data store (e.g., in which log information is stored as individual objects, such as text files). In some embodiments, the log information can include identifying information (e.g., a code or name) of the content delivery edge that received the request, identifying information of the requested content item (e.g., a portion of a universal resource identifier (URI) corresponding to the content item), and/or identifying information associated with the origin information. In some embodiments, log information can include information identifying a type of content that was requested, such as a video, an image, a web page, etc.

In some embodiments, when many client devices are requesting content associated with a particular user of the content delivery network, the number of cache misses can increase for various reasons, which can cause an increase in requests for content from the origin (e.g., from origin server 108). For example, if client devices are requesting many different content items, the likelihood that up to date versions of all of the content items are cached at each content delivery edge is relatively low, which can increase the number of cache misses that occur (and that are logged). In a more particular example, the same content item can be treated as multiple different content items if requests received for the content item include different header information. As another example, if many client devices are all requesting the same content, if the expiration of the content is relatively short (e.g., because the content is dynamic content) content delivery edge 102 can send messages and/or retrieve updated content from origin server 108, which can be observed as an increase in the number of cache misses that occur.

As still another example, one or more errors can cause the number of cache misses to increase. In a more particular example, content delivery edge 102 can erroneously determine that the requested content is not cached. In another more particular example, content delivery edge 102 can erroneously determine that the cached version of the requested content has expired, causing content delivery edge 102 to send a message to determine whether the cached version of the content is the current version. In yet another more particular example, origin server 108 can erroneously indicate that the cached version of a content item is not the most recent version, causing origin server 108 to resend the same cached content. As still another more particular example, maintenance operations at content delivery edge 102 can cause more requests to be made to the user's origin server.

Many other situations can arise that may cause an increase in requests to a particular user's origin server (e.g., origin server 108). For example, load balancers associated with the content delivery network that distribute requests to different content delivery edges can be relatively slow to react to large increases in requests in a relatively short period of time. This can cause an edge server to be unresponsive to many requests, and these requests may instead be rerouted for the origin server to respond to directly, causing an increased load at the origin server. As another example, if a particular content delivery edge is not responsive it may lead to an increase in requests to a particular user's origin server that is serviced by that edge. This can be used as a signal that can be used to increase resources used to implement other users' origins, as they are likely to experience similar issues if there is an increase in requests beyond what the origin can handle.

In some embodiments, system 100 can include an origin scaling system 134 that can receive log information from content delivery network log repository 132, and that can use the log information (and, in some embodiments, other additional information) to determine whether the number of cache misses for content provided by origin server 108 is likely to increase or decrease in the future, and can send a signal to scale resources dedicated to providing access to the content provided by origin server 108. For example, if origin server 108 is implemented with scalable compute resources, such as through an electronic data storage service, a compute service, and/or a load balancing service, origin scaling system 134 can instruct the service to increase the compute resources used to implement connections to content hosted by origin server 108. For example, if origin scaling system 134 determines that the number of cache misses is likely to increase in the near future (e.g., within the next five minutes, next twenty minutes, next hour, etc.), origin scaling system 134 can instruct an electronic data storage service being used to implement origin server 108 to increase the resources used to implement origin server 108, such as by increasing the number of instances that are configured to respond to requests, to replicate the data being stored to additional storage instances such that the data can be accessed by more instances simultaneously. Similarly, in some embodiments, origin scaling system 134 can instruct a compute service and/or a load balancing service (e.g., implementing network load balancing, application load balancing, etc.) being used to implement origin server 108 to increase the number of instances associated with origin server 108 to increase the ability of origin server 108 to respond to requests.

Additionally or alternatively, in some embodiments, origin scaling system 134 can determine that the number of cache misses has increased by at least a predetermined amount (e.g., by determining that the ratio of cache hits to cache misses has decreased by a particular amount), and origin scaling system 134 can send an instruction to a service providing the compute resources to implement origin server 108 to increase the amount of resources allocated to providing origin server 108.

In some embodiments, origin scaling system 134 can specify how many additional resources are to be dedicated to implementing origin server 108 and/or an amount of time for which the resources are to be dedicated to implementing origin server 108.

Additionally or alternatively, in some embodiments, origin scaling system 134 can determine that the number of cache misses is likely to decrease and/or has decreased by at least a predetermined amount, origin scaling system 134 can instruct the service(s) being used to implement origin server 108 to decrease the compute resources used to implement origin server 108.

Figure 2:
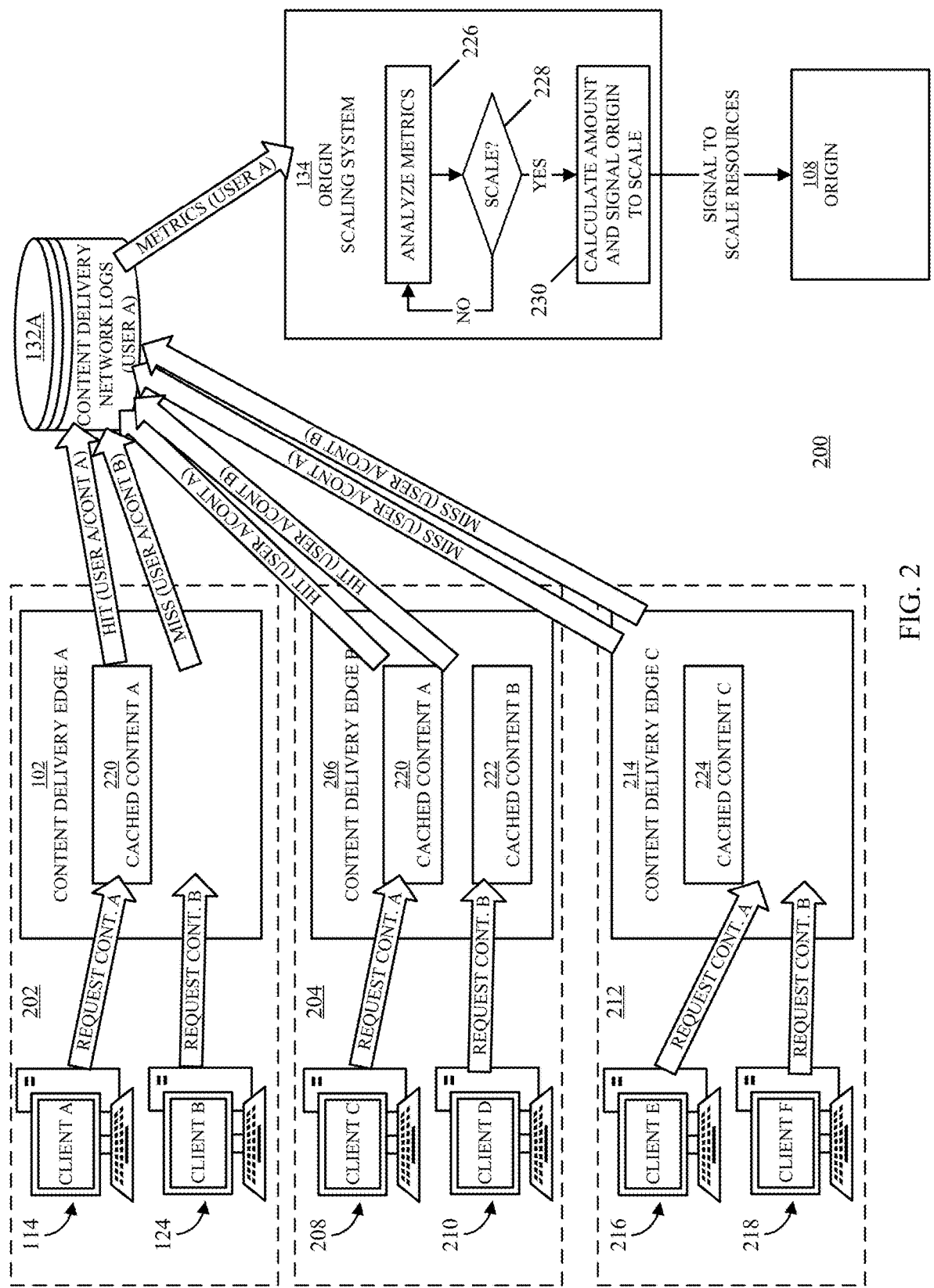
FIG. 2 is an example of another system for automatically augmenting user resources dedicated to serving content to a content delivery network in accordance with some embodiments of the disclosed subject matter.

FIG. 2 depicts an example of another system 200 for automatically augmenting user resources dedicated to serving content to a content delivery network in accordance with some embodiments of the disclosed subject matter. As shown in FIG. 2, a content delivery network can include many content delivery edges, which is represented in FIG. 2 by three different content delivery edges in three regions. For example, content delivery edge 102 can be located in a first region 202 (which can be a geographic region and/or a logical region defined by network connections) which can also include client devices 114 and 124. As another example, a second region 204 can include a second content delivery edge 206, and client devices 208 and 210, while a third region 204 can include a second content delivery edge 206, and client devices 208 and 210.

As shown in FIG. 2, edges in different regions can have different cached content. For example, content delivery edge 102 in region 202 can have content item A 220 cached, but not have a content item B 222 or a content item C 224 cached (or not have a current version of content items 222 and/or 224). As another example, content delivery edge 206 in region 204 can have content items 220 and 222 cached, but not have content item 224 cached. As yet another example, content delivery edge 214 in region 212 can have content item 224 cached, but not have content items 220 and 222 cached.

In some embodiments, the differences in cached content can cause the same request submitted from similar client devices to generate different responses from the various content delivery edges. For example, if client devices 114 and 124 request content items A and B, respectively, content delivery edge 102 can determine that content item A is cached as content item 220, but that content item B is not cached. In such an example, content delivery edge 102 can send log information indicating that the request for content item A from client device 114 was a cache hit (potentially among other information), and can send log information indicating that the request for content item B from client device 124 was a cache miss. Similarly, because both content items 220 and 222 are cached by content delivery edge 206, when requests for the content items are received from client devices 208 and 210, respectively, content delivery edge 206 can send log information indicating that the request for content item A from client device 208 was a cache hit, and log information indicating that the request for content item B from client device 210 was a cache hit. By contrast, because neither content item 220 nor 222 is cached by content delivery edge 214, when requests for the content items are received from client devices 216 and 218, respectively, content delivery edge 214 can send log information indicating that the request for content item A from client device 216 was a cache miss, and log information indicating that the request for content item B from client device 218 was also a cache miss.

In some embodiments, log information from various content delivery edges for content associated with a particular user (e.g., user A associated with compute resources 106) can be sent to content delivery network log repository 132 (shown in FIG. 2 as 132A to indicate that the log information related to requests for content associated with user A can be associated with user A in content network log repository 132), and can be associated with the user. In some embodiments, compute resources associated with content delivery network log repository 132 can aggregate the log information across the content delivery network, and can generate metrics related to, among other things, the number of cache hits and the number of cache misses during one or more time periods (e.g., within the last five seconds, ten seconds, minute, etc.). In some embodiments, the metrics can be sent to an origin scaling system 134 for analysis. Note that, in some embodiments, the metrics can be sent from content delivery network log repository 132 to origin scaling system 134 in response to a request for such metrics from origin scaling system 134. Additionally of alternatively, the metrics can be sent from content delivery network log repository 132 to origin scaling system 134 based on another criterion or criteria, rather than in response to a request (e.g., periodically at regular intervals, when the metric is updated, etc.).

In some embodiments, origin scaling system 134 can receive the metric information for a particular user (e.g., user A), and, at 226, can analyze the metrics to determine whether the number of cache misses (and/or the rate of cache misses) is likely to increase in the future (e.g., in the next minute, five minutes, ten minutes, thirty minutes, one hour, twelve hours, twenty four hours, etc.). Note that origin scaling system 134 can receive metric information in response to a request sent by origin scaling system 134 and/or without sending such a request (e.g., metric information can be pushed to origin scaling system 134).

Origin scaling system 134 can use any suitable technique or combination of techniques to determine whether the number of cache misses (and/or rate of cache misses) is likely to increase in the future at 226. For example, in some embodiments, origin scaling system 134 can compare the ratio of cache hits to cache misses within a predetermined period of time (e.g., within the last minute, five minutes, ten minutes, thirty minutes, one hour, twelve hours, twenty four hours, etc.), and if the ratio falls below a threshold (or vice versa, if the ratio of cache misses to cache hits rises above a threshold) origin scaling system 134 can determine that the number of cache misses (and/or rate of cache misses) is likely to continue to be elevated and/or to increase beyond the current amount.

As another example, in some embodiments, origin scaling system 134 can determine the rate of change (and direction) of the ratio of cache hits to cache misses, and if the rate of change increases by more than a threshold amount (e.g., if the rate of change indicates that the decrease in the ratio is falling exponentially), origin scaling system 134 can determine that the number of cache misses (and/or rate of cache misses) is likely to continue to be elevated and/or to increase beyond the current amount.

As yet another example, in some embodiments, if the ratio of cache hits to cache misses and/or the rate of change of cache hits to cache misses indicates an increasing amount of cache misses, origin scaling system 134 can cause further analysis to be carried out. In a more particular example, in some embodiments, origin scaling system 134 can cause one or more features associated with relatively recent activity associated with the user to be provided as input to a machine learning system that can provide an output indicative of whether an increase in the number (and/or rate) of cache misses is likely. For example, when the user provides new content via the content delivery network, features associated with the new content can be provided to the machine learning system to determine a likelihood that the content will cause an increase in cache misses. As another example, if a particular content item has been requested more than a threshold number of times (e.g., 10% more than the average requests, 25% more, 50% more, etc.) within a particular time period (e.g., within the last hour, six hours, twelve hours, one day, etc.), features associated with that content item can be provided to the machine learning system to determine a likelihood that the content will cause an increase in cache misses.

If origin scaling system 134 determines that the scaling of the origin server in anticipation of an increase in cache misses is warranted (e.g., due to a prediction that the number of cache misses will increase in the near future) ("YES" at 228), origin scaling system 134, at 230, can calculate an amount by which to scale the origin associated with the anticipated increase (or decrease) in cache misses and can send a signal to origin server 108 (and/or a service providing resources used to implement origin server 108) to scale the resources used to implement the origin up or down. Any suitable resources can be scaled based on the metrics received at 226, such as resources described above in connection with origin scaling system 134 of FIG. 1.

Figure 3:
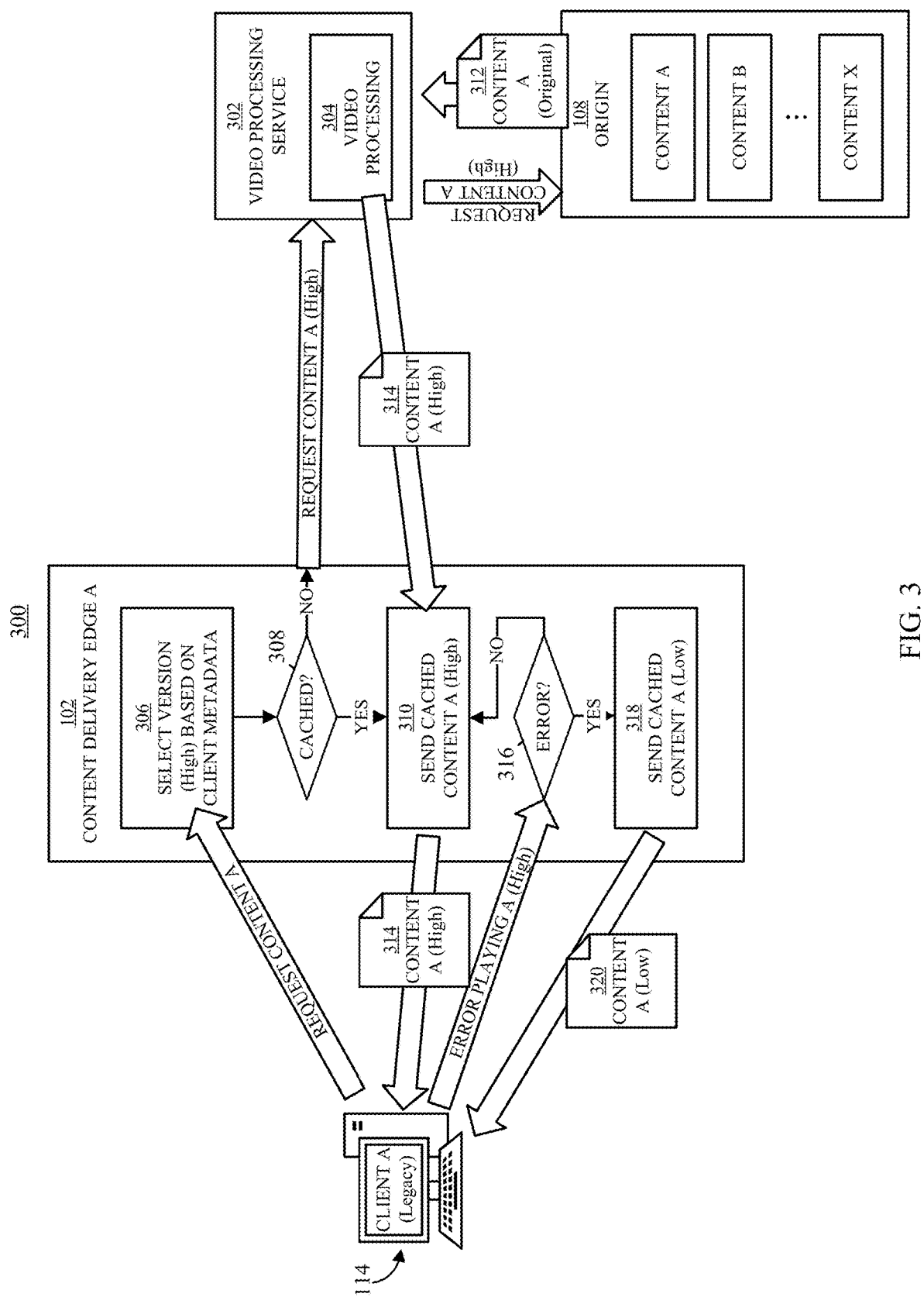
FIG. 3 is an example of a system for automatically serving a different version of content responsive to a rendering error at a client device in accordance with some embodiments of the disclosed subject matter.

FIG. 3 depicts an example of a system 300 for automatically serving a different version of content responsive to a rendering error at a client device in accordance with some embodiments of the disclosed subject matter. As shown in FIG. 3, in some embodiments, system 300 can include a video processing service 302 that is configured to perform one or more video processing operations 304 to video made available by origin server 108 prior to delivery of the video to a client and/or a content delivery network. For example, in some embodiments, video processing service 302 can be configured to transcode video content stored by origin server 108 to one or more other formats. As another example, video processing service 302 can be configured to encode streaming video content as it becomes available from origin server 108 to one or more formats. As yet another example, in some embodiments, video processing service 302 can be configured to perform one or more security operations to video from origin 108 (e.g., adding digital rights management, encryption, etc.). In some embodiments, video processing service 302 can be implemented using one or more physical servers and/or one or more virtual machines configured to execute video processing operations 304. Additionally, in some embodiments, video processing service 302 can be provided as part of a video processing service which may or may not be provided by the same service provider that is associated with the content delivery network including content delivery edge 102.

In some embodiments, when a content item is available from origin 108 and/or video processing service 302 in multiple different formats and a request for the content is received at content delivery edge 102, content delivery edge 102 can determine, at 306, which version of the content is most appropriate for the requesting client. For example, in some embodiments, based on metadata associated with the client, content delivery edge 102 can determine a highest quality version of the content that can be appropriately rendered (e.g., without video lag, without repeated buffering, etc.) by the requesting client. In such an example, the metadata can be indicative of a device type of the client (e.g., whether the device is a smartphone, tablet computer, desktop computer, a streaming media player, a smart television, etc.). In some embodiments, information indicating which version of the content is being requested can be explicitly sent by the requesting client device in association with the request.

In the example shown in FIG. 3, client device 114 is a legacy device (e.g., a tablet computer that is at least two years old) that is not capable of appropriately rendering higher quality versions of the requested content. In a more particular example, client device 114 may be incapable of appropriately rendering the three highest quality versions of the requested content of six total versions. As shown in FIG. 3, content delivery edge 102 may erroneously select one of the three highest quality versions to send to client device 114 for various reasons. For example, client device 114 may send inaccurate metadata. As another example, a software bug may cause content delivery edge 102 to select an inappropriately high quality version of the requested content.

As shown in FIG. 3, despite client device 114 not being capable of appropriately rendering higher quality versions of the requested content (i.e., content item A), at 306 content delivery edge 102 selects the highest quality version of the content as the version to provide to client device 114. At 308, content delivery edge 102 can determine whether the selected content item is currently cached by content delivery edge 102. If content delivery edge 102 determines that the selected content item is currently cached ("YES" at 308), content delivery edge 102 can begin sending the cached content item to client device 114, at 310. Otherwise, if content delivery edge 102 determines that the selected content item is not currently cached ("NO" at 308), content delivery edge 102 can request the content from video processing service 302. In some embodiments, video processing service 302 can store one or more versions of each content item such that video processing service 302 can serve as an origin for the content and/or as a proxy for origin server 302. Additionally or alternatively, in some embodiments, video processing service 302 may not have an up to date version of the requested content, and can request the media content item from origin server 108, and upon receipt process and serve the media content item. In some embodiments, video processing service 302 can receive an original version of the content (e.g., original content item A 312) at any suitable time. For example, in some embodiments, video processing service 302 can request the content from origin server 108 in response to instructions (e.g., instructions from user A) to provide versions of a particular content item. As another example, video processing service 302 can periodically (e.g., at regular and/or irregular intervals) send a request to origin server 108 to determine whether there is a newer version of the content, and can receive the newer version if it exists (e.g., as a response to the request or as a response to another request for the new version of the content). In such examples, video processing service 302 can receive the underlying media content item (e.g., a copy of the original content item having a particular resolution and/or format) from origin server 108 . . . .

In some embodiments video processing service 302 can send the requested version of the content item (e.g., a most resource intensive version 314 of content item A that causes the most computing and/or network resources to be used in delivering the content to the client device) to content delivery edge 102, which can send that version to client device 114 that requested the content item. In some embodiments, content delivery edge 102 can determine whether client device 114 is rendering the content item that was sent. For example, the client device 114 may send a signal to the content delivery edge 102 indicating that rendering has begun and/or is proceeding successfully. In another example, the client device 114 may only send a signal if rendering fails; the content delivery edge 102 may wait a predetermined length of time to receive an error signal, and if none is received, the content delivery edge 102 may assume that the content is being rendered.

In some embodiments, at 316, content delivery edge 102 can determine client device 114 was unable to render the content sent by content delivery edge 102 at 310. If content delivery edge 102 determines that client device 114 is rendering the content ("YES" at 316), content delivery edge 310 can continue to send the content at 310. Otherwise, if content delivery edge 102 determines that client device 114 is not rendering the content ("NO" at 316), content delivery edge 102 can move to 318 to send a less resource intensive version of the content (e.g., a least resource intensive version of the content 320). Note that versions of content are described below as being of varying quality (e.g., having different resolutions, different frame rates, different features, etc.), but this is merely used as an example of versions that use varying amounts of computing and/or network resources of origin server 108, video processing service 302, and/or content delivery edge 102. In some embodiments, the lowest quality version of content item 312 may be cached by content delivery edge 102 (as shown in FIG. 3), however this is merely an example, and content delivery edge 102 may request the lowest quality version of the content from video processing service 302. Alternatively, in some embodiments, content delivery edge 102 can send the lowest quality version of the requested content that is currently cached.

In some embodiments, after sending the lower quality version of the requested content at 318, content delivery edge 102 can again determine whether client device 114 is able to render the content. Although not shown in FIG. 3, content delivery edge 102 can determine a highest quality version of the requested content that client device 114 is capable of appropriately rendering. For example, as described below in connection with FIGS. 7A and 7B, content delivery edge 102 can first send the lowest quality version of the content that is available, and if that version is rendered by client device 114, can send a version between the lowest quality version and the version that initially failed to be rendered. For example, if there are six versions of the content item, and content delivery edge 102 originally sent the highest quality version content delivery edge 102 can send the third or fourth highest quality version (which may or may not be cached by content delivery edge 102). If that version is rendered by client device 114, content delivery edge 102 can send the next highest quality version of the content until client device 114 is incapable of appropriately rendering another version of the content, or client device 114 renders the version of the content that is the next lowest quality after the version that was originally sent to client device 114. Otherwise, if the version of the content item between the initial version and the lowest quality version is not rendered by client device 114, content delivery edge 102 can send the next highest quality version of the content until client device 114 is capable of appropriately rendering the content.

In some embodiments, when a playback error occurs content delivery edge 102 can send log information indicating that the error occurred, and other information, such as the version that was sent, the metadata received from the client device, etc.

In some embodiments, one or more techniques described above in connection with system 300 (and/or below in connection with FIGS. 7A and 7B) can be used to provide cached versions of content of lower quality than a client device may be capable of rendering in response to observed and/or predicted increase in the number (and/or rate) of cache misses for relatively higher quality versions of the content. For example, if origin scaling system 134 determines that an increase in cache misses is anticipated, origin scaling system 134 can (e.g., in addition to, or in lieu of, augmenting resources dedicated to acting as origin server 108) instruct each content delivery edge (e.g., including content delivery edge 102) to serve a cached version that may be of lower quality than the requested version. In such an example, origin scaling system 134 can instruct the content delivery edges to deliver a cached version (e.g., rather than requesting the higher quality version from the origin) until additional resources dedicated to acting as origin server 108 are online and ready to respond to requests for content from content delivery edges.

Note that although FIG. 3 is described in connection with providing different versions of video having varying quality, video is merely an example of a type of content, and the techniques described above in connection with FIG. 3 can be used in connection with any type of content that has versions intended for different computing devices and/or that use varying amounts of computing and/or network resources of origin server 108, video processing service 302, and/or content delivery edge 102 (e.g., a web page, a graphical user interface, an application, etc.).

Figure 4:
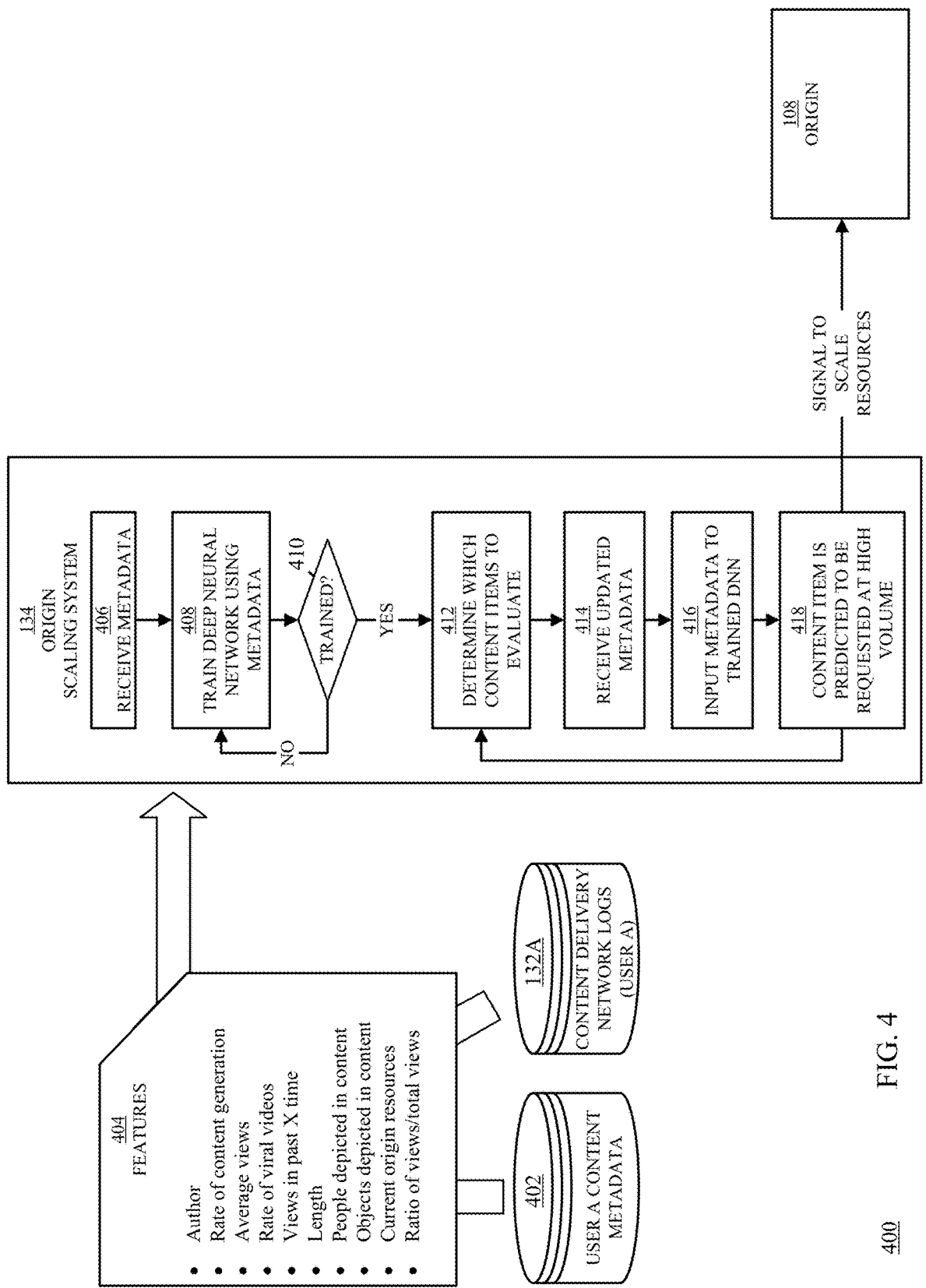
FIG. 4 is an example of a system for automatically augmenting user resources dedicated to serving content to a content delivery network based on a predicted increase in demand for user resources dedicated to serving content to a content delivery network in accordance with some embodiments of the disclosed subject matter.

FIG. 4 depicts an example of a system 400 for automatically augmenting user resources dedicated to serving content to a content delivery network based on a predicted increase in demand for user resources dedicated to serving content to a content delivery network in accordance with some embodiments of the disclosed subject matter. As shown in FIG. 4, information from a repository 402 of metadata related to content made available by a user (e.g., a user of compute resources 106) can be made available to origin scaling system 134, which can use the information to train an artificial neural network to predict increases in demand for origin resources (e.g., due to an increase in cache misses). In some embodiments, a user associated with metadata repository 402 can grant permission to origin scaling system 134 to access (e.g., read access) to at least a portion of metadata repository 402, which can retrieve information from metadata repository 402 programmatically (e.g., via an API associated with metadata repository 402). Additionally or alternatively, in some embodiments, the user associated with metadata repository 402 can access information from metadata repository 402, and can send a selection of the information (up to all the information) included in metadata repository 402. Additionally or alternatively, in some embodiments, other types of machine learning techniques can be used to predict increases in request to the origin, such as support vector machine techniques, naïve Bayes classification techniques, etc.

In some embodiments, at 406, origin scaling system 134 can receive the metadata related to content associated with a user. In some embodiments, origin scaling system 134 can generate features from the received metadata and/or from information included in content delivery network log repository 132. For example, for each item of content (e.g., each video) origin scaling system 134 can determine one or more of: the author of the content item; the average number of times that the content item is requested per day; the number of times that the content item has been requested in a particular period of time; the length of the content item, identifying information of people depicted in a video and/or audio content item (e.g., which can be based on metadata and/or image (and/or audio) processing to identify people depicted in the content item); identifying information of objects depicted in a video content item and/or discussed in an audio content item (or audio portion of a video content item); a comparison between the number of times that the content item has been requested and the total number of times that content from the same author have been requested (e.g., a ratio or percentage indicating the contribution of the content item to the total requests for a particular author's content over a particular period of time); information about a cache miss rate and/or cache hit rate for the content item across one or more (e.g., all) content delivery edges of the content delivery network; how often the content item has been updated; the expiration period assigned to the content item; and/or any other suitable information about the content item.

As another example, origin scaling system 134 can determine information about the author of the content and/or the user, such as: the rate at which the author generates new content; the rate at which the user makes new content available via the content distribution network; the resources available to an origin server associated with the user over time; the rate at which content items from the author and/or user experience a rapid increase in the number of requests for the content item in a relatively short period of time (e.g., the number of requests for the content increases exponentially over the course of several hours); the average number of times that content items associated with the author and/or user is requested (e.g., per day); and/or any other suitable information about the content item.

In some embodiments, features associated with content items, authors, and/or the user can be associated with a particular point in time and/or a particular period of time. For example, features for a particular content item can be associated with a time at which the information is received. As another example, features for a particular content item can be associated with a time just before (e.g., at a time corresponding to an infection point) and/or during a relatively rapid increase in the number of requests for the content (e.g., as an example of features corresponding to a content item that is likely to lead to an increase in cache misses). As yet another example, features for a particular content item can be associated with a time (or time period) during which an average number of requests for the content item were received.

In some embodiments, one or more of the features derived from the metadata received at 406 can be used to train a deep neural network (DNN). In some embodiments, the DNN can be trained using any suitable technique or combination of techniques. For example, in some embodiments, the DNN can be trained using one or more supervised learning approaches in which a group of features is associated with a label indicating a class that the set of features exemplifies. In such an example, each set of features can be associated with a label indicating whether the rate at which the content item was requested increased, decreased, or stayed the same (e.g., the average rate of requests remained relatively stable) in a time subsequent to the time represented by the features. Additionally or alternatively, in such an example, each set of features can be associated with a label indicating the rate at which the content item associated with the set of features represents increased in a time period following the time period represented by the set of features. In a more particular example, labels corresponding to rates of increase can be associated with each set of features that correspond to classes for which the DNN is being trained to classify sets of features into to attempt to predict when a particular content item is expected to be requested more often and/or cause an increase in the number of cache misses.

As another example, in some embodiments, the DNN can be trained using one or more reinforcement learning techniques, such as techniques described below in connection with FIG. 5.

As yet another example, in some embodiments, the DNN can be trained using one or more unsupervised learning techniques. In such an example, groups of features associated with various content items can be provided to the DNN as training data, and the DNN can cluster the training data using one or more clustering techniques, one or more automatic classification techniques, and/or any other suitable techniques. In a more particular example, in some embodiments, the DNN can automatically group together content items into a predetermined number of groups such that members of each are more similar to each other than to members of one of the other groups using the features associated with the content items. In such a more particular example, different groups can be associated with different likelihoods that the number of requests for the content item will increase and/or by how much the number of requests will increase.

In some embodiments, the DNN can be trained using features corresponding to content from a single user. Alternatively, in some embodiments, features corresponding to content from various users can be used to train a DNN. For example, the DNN can be trained using features corresponding to many different users, which can be used to generate a base DNN that can be used in connection with any user and/or authors' content. In some embodiments, a base DNN can be customized to a particular user (e.g., through additional training using features corresponding to the user's content, through ongoing reinforcement learning, through transfer learning techniques, etc.). In some embodiments, users can grant origin scaling system 132 permission to access metadata associated with the user's content for use in generating a base DNN. For example, users can receive compensation for permitting use of metadata associated with the user's content (e.g., as a discount to price paid for services, as free access to the base DNN, etc.).

In some embodiments, origin scaling system 134 can determine, at 410, whether the DNN is trained using any suitable technique or combination of techniques. For example, in some embodiments, origin scaling system 134 can determine the performance of the DNN after a training iteration (e.g., the accuracy with which the DNN predicts increases in the number of cache misses, the accuracy with which the DNN predicts increases in the number of requests for a particular content item, the specificity and/or sensitivity of the DNN, the cost that would have been avoided by scaling resources based on the output of the DNN to avoid disruptions to end users, etc.).

If origin scaling system 134 determines that the DNN is not trained ("NO" at 410), origin scaling system 134 can return to 408 and can continue to train the DNN. Otherwise, if origin scaling system 134 determines that the DNN is sufficiently trained ("YES" at 410), origin scaling system 134 can begin using the trained DNN at 412 to 418. In some embodiments, at 412, origin scaling system 134 can determine which content items (if any) are to be evaluated using the trained DNN. For example, origin scaling system 134 can determine that any new content items (e.g., content items that have been added to origin information 110) are to be evaluated. As another example, origin scaling system 134 can determine which content items have been requested by at least a threshold amount more than average lately (e.g., within the last hour, six hours, 12 hours, day, week, etc.). In a more particular example, origin scaling system 134 can determine whether the amount of requests received for each content item available via origin server 108 is greater than average by at least a certain amount (e.g., 10%, 25%, 33%, 50%, etc., greater than average), and can select content items that exceed that threshold for evaluation. The average number of requests can be determined using any suitable technique or combination of techniques. For example, the average can be a rolling average that factors in a particular number of days (e.g., average over the last week), a weighted average that places more emphasis on recent requests, etc.

At 414, origin scaling system 134 can receive updated metadata corresponding to a particular content item (or content items) at a current or recent point in time. In some embodiments, origin scaling system 134 can provide features based on the updated metadata to the trained DNN at 416.

At 418, in some embodiments, origin scaling system 134 can determine that a content item is predicted to cause an increase in cache misses in the future. For example, the output of the DNN can indicate that the content item is predicted to be requested at relatively high (and increasing) volume in the future (e.g., in the next minute, next five minutes, next thirty minutes, next hour, etc.) based on the output of the trained DNN when provided with the features based on the updated metadata received at 414. As another example, origin scaling system 134 can determine an amount by which the volume of requests for the content item is predicted to increase and/or a rate at which the volume of requests for the content item is predicted to increase based on one or more outputs of the DNN. Note that volume can be quantified in various ways, such as based on a rate of requests (e.g., number of requests per second, per minute, etc.) or based on the total number of requests received in a particular time period (e.g., number of requests received in the past minute, hour, day, etc.).

In some embodiments, based on the predicted increase in the number of cache misses (and/or rate of cache misses), origin scaling system 134 can send a signal to origin server 108 to increase the resources used to implement origin server 108.

Figure 5:
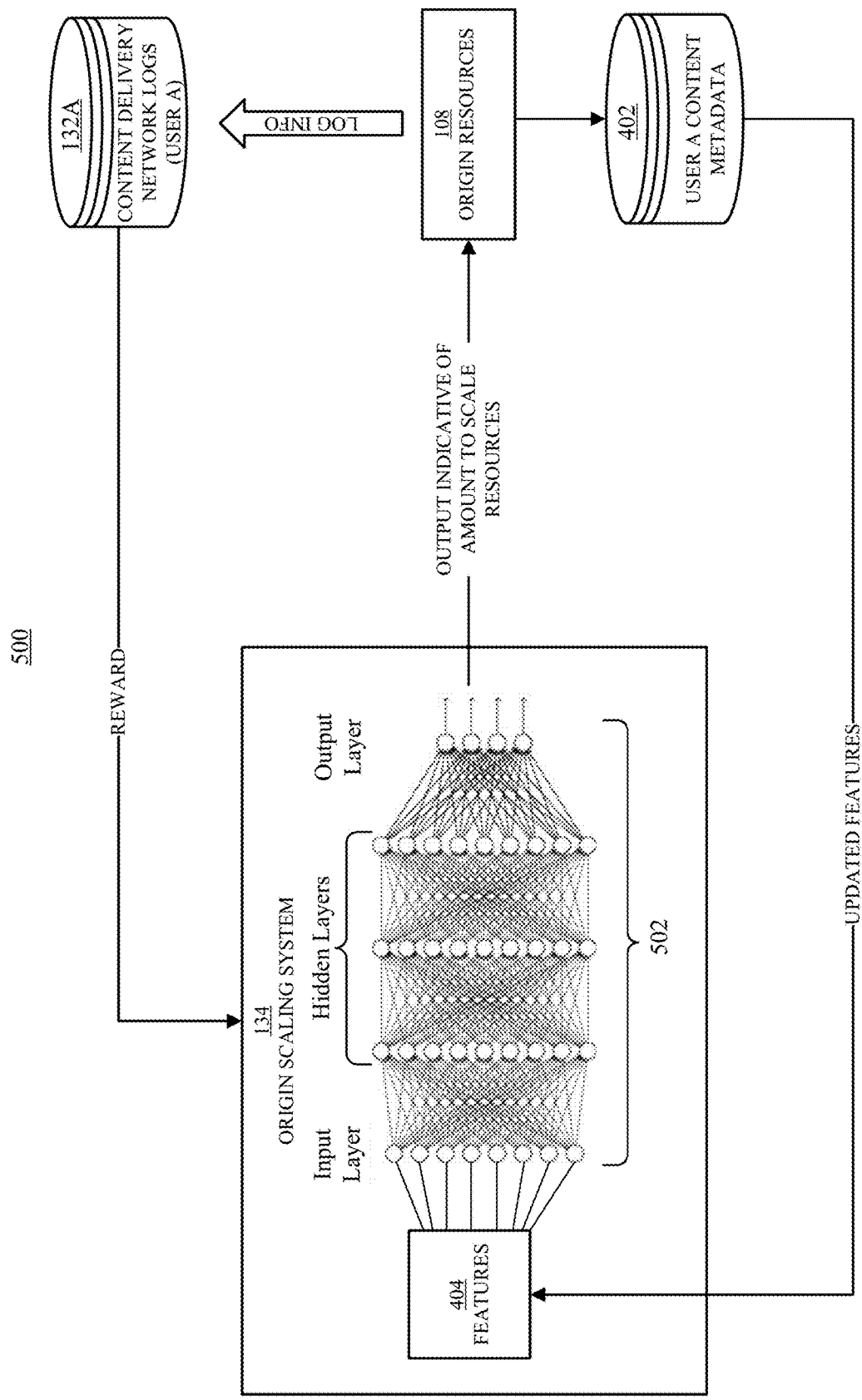
FIG. 5 is an example of a system for predicting an increase in demand for user resources dedicated to serving content to a content delivery network in accordance with some embodiments of the disclosed subject matter.

FIG. 5 depicts an example of a system 500 for predicting an increase in demand for user resources dedicated to serving content to a content delivery network in accordance with some embodiments of the disclosed subject matter. As shown in FIG. 5, in some embodiments, a DNN 502 can be implemented using one or more reinforcement learning techniques. For example, DNN 502 can receive features 404 as inputs, and can make a prediction a rate of increase in cache misses and/or requests for the content item corresponding to features 404, and based on the prediction, origin scaling system 134 can produce a signal indicative of an amount by which to scale origin resources. Note that although DNN 502 is depicted with a particular number of layers including specific numbers of nodes, this is merely an example, and is not intended to limit the architecture of the DNN to what is shown in FIG. 5. Rather, DNN 502 can have any suitable number of layers, each including any suitable number of nodes.

In some embodiments, origin resources can be scaled based on the signal from origin scaling system 134, and the performance of origin 108 can be recorded in content delivery network log repository 132. For example, the number of cache misses logged during a period of time following the output of DNN 502 can be sent to content delivery network log repository 132.

In some embodiments, origin scaling system 134 can generate reward (or penalty) information based on one or more of the cache hit rate during a period of time following the output of DNN 502, the cache miss rate, the ratio of cache hits to cache misses (and/or vice versa), the cost incurred by scaling the resources used to implement origin server 108, and/or any other suitable metrics. Note that some information used to generate the reward or penalty can be received from one or more other sources and/or inferred from other known information (e.g., the instruction to increase the resources used to implement origin server 108 can be used to infer the cost incurred by the instruction). In some embodiments, parameters associated with one or more nodes of DNN 502 can change over time based on the reward.

In some embodiments, in addition to, or in lieu of, training DNN 502 using rewards based on the behavior of origin server 108, DNN 502 can be trained using simulated information generated based on historical data. For example, a predication made by DNN given features corresponding to a content item just before requests for the content item begin increasing exponential can be used to simulate the effect that scaling the origin would have likely had on one or more performance metrics of origin server 108, and the reward can be generated based on the simulated effects.

Figure 6:
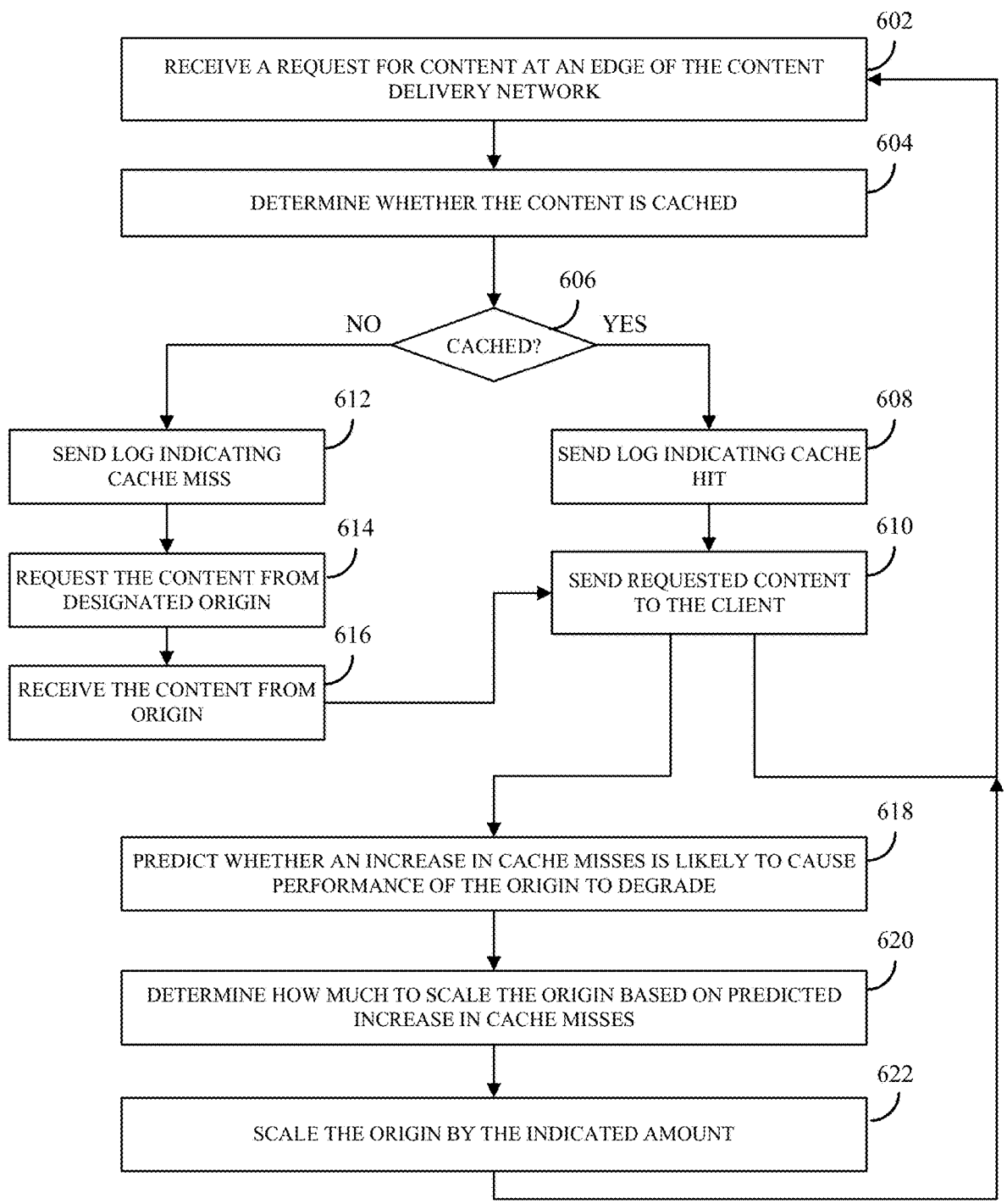
FIG. 6 is an example of a process for automatically augmenting user resources dedicated to serving content to a content delivery network in accordance with some embodiments of the disclosed subject matter.

FIG. 6 depicts an example of a process 600 for automatically augmenting user resources dedicated to serving content to a content delivery network in accordance with some embodiments of the disclosed subject matter. As shown in FIG. 6, at 602, process 600 can receive a request for content from a client device at a selected edge server of a content delivery network (e.g., content delivery edge 102). As described above in connection with FIG. 1, the particular edge to which the request from a particular client is sent can be based on which edge can that is best able to serve the request from the client device, based on latency, number of logical connections, etc.

At 604, process 600 can determine whether the content requested at 602 is cached at the edge that received the request. In some embodiments, process 600 can use any suitable technique or combination of techniques to determine whether the requested content is cached. For example, in some embodiments, process 600 can determine whether a content item associated with at least a portion of the IP address to which the request was sent is within the cache. As another example, process 600, having determined that a version of the requested content is cached, can determine whether the cached version has expired. As yet another example, process 600 can determine, based on the request, which version of the content is most appropriate for the client device from among version of the content item of varying quality (e.g., as described above in connection with FIG. 3), and can determine if the particular selected version is cached.

If process 600 determines that the requested content is cached ("YES" at 606), process 600 can move to 608 at which process 600 can send log information (e.g., to content delivery network log repository 132 described above in connection with FIG. 1) indicating that the requested content was already cached (e.g., log hit information 122 described above in connection with FIG. 1). In some embodiments, process 600 can also move to 610 to send the cached content in response to the request received at 602.

Otherwise, if process 600 determines that the requested content is not cached ("NO" at 606), process 600 can move to 612 at which process 600 can send log information (e.g., to content delivery network log repository 132 described above in connection with FIG. 1) indicating that the requested content was not cached (e.g., log miss information 126 described above in connection with FIG. 1). In some embodiments, process 600 can also move to 614 to request the content from the designated origin server for that content. Additionally or alternatively, in some embodiments, process 600 can query the origin server to determine whether a currently cached expired version of the content is up to date. In such embodiments, the origin server can indicate that the content has not changed, or that the content has changed (e.g., by sending a new version of the content). Note that, in some cases, if the origin server is receiving many requests for content in a short period of time, the origin server may not be capable of responding to each of the requests with the requested content in a timely manner. In some such cases, this can result in an error message being conveyed to the client and/or an extended lag between when the request was sent by the client device and when the content is sent back to the client device at 610.

At 616, process 600 can begin receiving content in response to the request submitted to the origin server at 616, and can move to 610 to begin sending the content item as it is received and cached at the edge.

In some embodiments, from 610, process 600 can return to 602 to continue to receive requests for content, and can also move to 618. At 618, process 600 can determine whether the current and/or projected ratio of non-cached content to cached content (e.g., a cache miss to cache hit ratio, or vice versa) is likely to cause performance of the designated origin to degrade. In some embodiments, process 600 can use any suitable technique or combination of techniques to determine whether the current and/or projected ratio of non-cached content to cached content is likely to cause performance of the designated origin to degrade. For example, as described above in connection with FIG. 1, process 600 can determine that the ratio has increased (or decreased) by at least a threshold amount. As another example, as described above in connection with FIGS. 4 and 5, process 600 can determine that the number of cache misses is likely to increase based on an output of a deep neural network.

At 620, process 600 can determine an amount by which to increase (or decrease) resources dedicated to serving content to a content delivery network by increasing (or decreasing) resources used to implement the origin server. For example, as described above in connection with 230 of FIG. 2, 416 of FIG. 4, and FIG. 5, process 600 can determine the amount of additional resources to dedicate to acting as origin server 108 based on the anticipated increase in requests to the origin.

At 622, process 600 can cause the origin to be scaled by the amount determined at 620 using any suitable technique or combination of techniques. For example, in some embodiments, process 600 can send an API call to a service being used to provide compute resources for origin server 108 to increase the amount of resources used to provide access to content hosted by origin server 108. In some embodiments, process 600 can return to 602 to continue to receive requests for content from client devices.

Figure 7A:
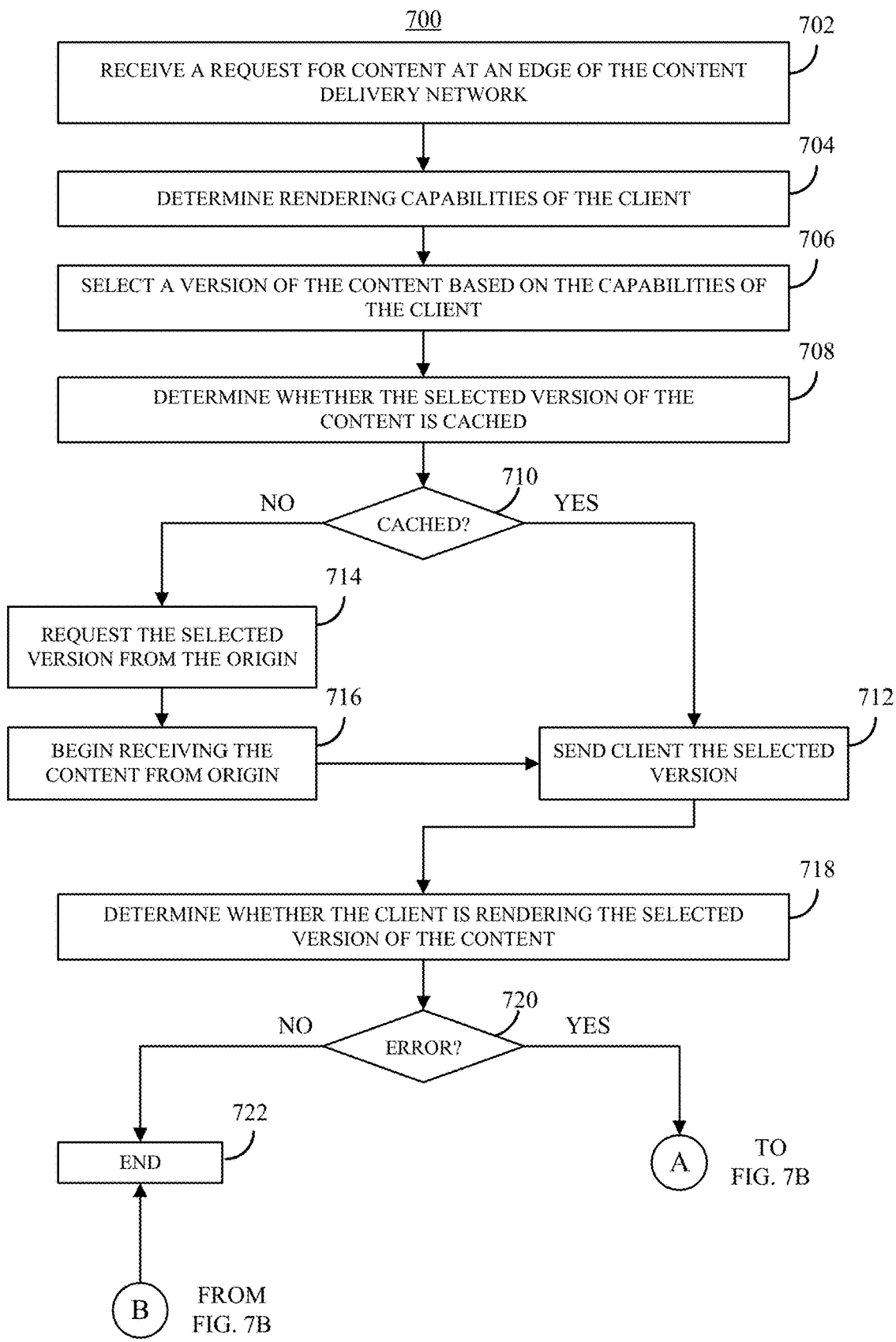
FIG. 7A is an example of a portion of a process for automatically serving a different version of content responsive to a rendering error at a client device in accordance with some embodiments of the disclosed subject matter.
Figure 7B:
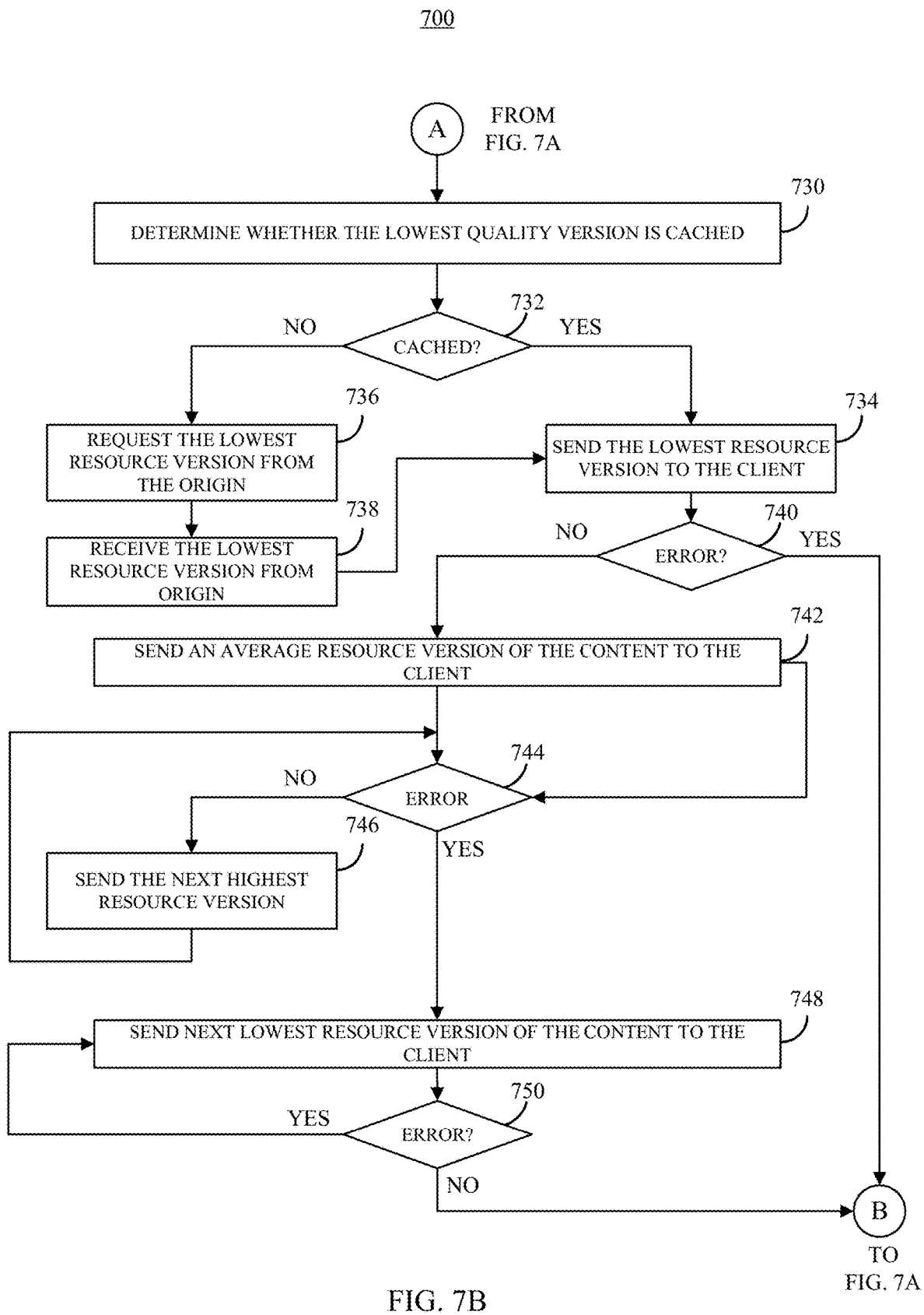
FIG. 7B is an example of another portion of the process for automatically serving a different version of content responsive to a rendering error at a client device in accordance with some embodiments of the disclosed subject matter.

FIGS. 7A and 7B depict an example of a portion of a process 700 for automatically serving a different version of content responsive to a rendering error at a client device in accordance with some embodiments of the disclosed subject matter. As shown in FIG. 7, at 702, process 700 can receive a request for content from a client device at a selected edge server of a content delivery network (e.g., content delivery edge 102). In some embodiments, process 700 can receive the request at a particular edge server using any suitable technique or combination of techniques, such as techniques described above in connection with 602 of FIG. 6.

At 704, process 700 can determine one or more content presentation capabilities of the client device that requested the content based on information about hardware and/or software (e.g., an operating system, an operating system version, etc.) of the client device. In some embodiments, process 700 can use any suitable technique or combination of techniques to determine the capability of the requesting client device, such as techniques described above in connection with 306 of FIG. 3.

At 706, process 700 can select a version of the requested content to send to the client device as a response to the request based on the capabilities of the device. For example, as described above in connection with FIG. 3, process 700 can select a version that is determined as being most appropriate for the client device.

At 708, process 700 can determine whether the version of the content selected for the client device is cached by the edge server that received the request at 702.

If process 700 determines that the version is cached by the edge server ("YES" at 710), process 700 can move to 712 and can begin sending the selected version of the content to the client device that requested the content. Otherwise, if process 700 determines that the version is cached by the edge server ("YES" at 710), process 700 can move to 714 to request the selected content from the designated origin server for that content.

At 716, process 700 can begin receiving content in response to the request submitted to the origin server at 714, and can move to 712 to begin sending the content item as it is received and cached at the edge.

At 718, process 700 can determine whether the client device is rendering the selected version of the content that has been (and/or is currently being) sent to the client device. In some embodiments, process 700 can use any suitable technique or combination of techniques to determine the capability of the requesting client device, such as techniques described above in connection with 316 of FIG. 3.

If process 700 determines that the client device is rendering the content ("YES" at 720), process 700 can end and the content can continue to be sent to the client device. Otherwise, if process 700 determines that the client device is not rendering the content ("NO" at 720), process 700 can move to 730 shown in FIG. 7B.

At 730, process 700 can determine whether the lowest quality version of the requested content is cached in the edge server (and/or whether a version of lower quality than the selected version is cached). If process 700 determines that the lowest quality version is cached ("YES" at 732), process 700 can move to 734, and can send the lowest quality version to the requesting client device (e.g., in lieu of the version sent at 712). Otherwise, if process 700 determines that the lowest quality version is not cached ("NO" at 732), process 700 can move to 736 to request the lowest quality version of the content from the designated origin server for that content.

At 738, process 700 can begin receiving content in response to the request submitted to the origin server at 736, and can move to 734 to begin sending the lowest quality version of the content item as it is received and cached at the edge.

If process 700 determines that the client device is incapable of rendering the lowest quality version ("YES" at 740), process 700 can end at 722 (e.g., by causing an error message to be presented by the client device). Otherwise, if process 700 determines that the client device is rendering the lowest quality version ("NO" at 740), process 700 can move to 742 to send an average quality version of the content that is between the originally selected version and the lowest quality version of the content. In some embodiments, process 700 can determine whether the average quality version is cached by the edge server, and if it is not can request that version from the origin server (e.g., as described above in connection with the lowest quality version at 730-738). In some embodiments, if there are an even number of versions between the lowest quality version and the originally selected version, process 700 can send the version that closest to midway between the originally selected version and the lowest quality version that is closer to the originally selected version in quality.

If process 700 determines that the client device is rendering the average quality version ("NO" at 744), process 700 can move to 746 to send the next highest quality version to the client device. Otherwise, if process 700 determines that the client device is incapable of rendering the average quality version ("YES" at 740), process 700 can move to 748 to send a next lowest quality version of the content.

If process 700 determines that the client device is rendering the next lowest quality version ("NO" at 750), process 700 can move end at 722, and can continue to send the highest quality version that the client device is capable of rendering. Otherwise, if process 700 determines that the client device is incapable of rendering the next lowest quality version ("YES" at 750), process 700 can return to 748 to send a next lowest quality version of the content. In some embodiments, process 700 can be used to determine the highest quality version of the content that can be rendered by the client device when information associated with the client device is incorrect and/or when there is an error during a determination of which version to send.

Figure 8:
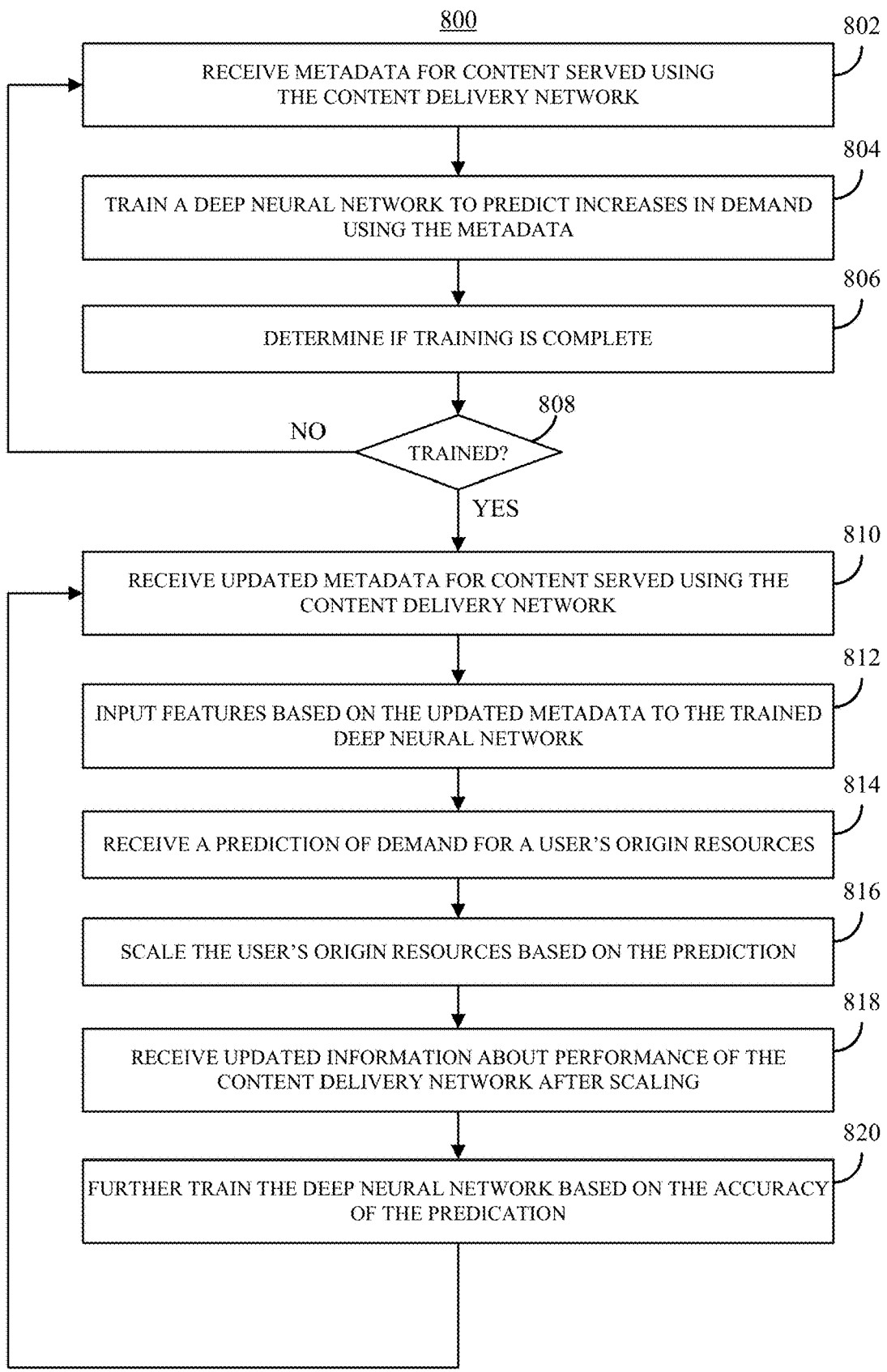
FIG. 8 is an example of a process for automatically augmenting user resources dedicated to serving content to a content delivery network based on a predicted increase in demand for user resources dedicated to serving content to a content delivery network in accordance with some embodiments of the disclosed subject matter.

FIG. 8 depicts an example of a process 800 for automatically augmenting user resources dedicated to serving content to a content delivery network based on a predicted increase in demand for user resources dedicated to serving content to a content delivery network in accordance with some embodiments of the disclosed subject matter. As shown in FIG. 8, at 802, process 800 can receive metadata corresponding to content served for one or more users by a content delivery network. In some embodiments, process 800 can receive the metadata using any suitable technique or combination of techniques, such as techniques described above in connection with 406 of FIG. 4.

At 804, process 800 can train a DNN to predict increases in demand for origin resources using the received metadata. In some embodiments, process 800 can train the DNN using any suitable technique or combination of techniques, such as techniques described above in connection with 408 of FIG. 4. Additionally, the DNN can be implemented using any suitable network architecture.

At 806, process 800 can determine whether to stop (an initial) training based on the performance of the DNN reaching a threshold. For example, in some embodiments, if performance of the DNN has not improved by at least a threshold amount in a specified number of training iterations, process 800 can terminate training. Note that, as described above in connection with FIGS. 4 and 5, the DNN can be trained using information from various users, rather than only information from a single user.

If process 800 determines that training of the DNN is incomplete ("NO" at 808), process 800 can return to 802 to continue to receive metadata and train the DNN. Otherwise, if process 800 determines that training of the DNN is complete ("YES" at 808), process 800 can move to 810.

At 810, process 800 can receive updated metadata corresponding to one or more items of content made available by a particular user of a content delivery network. In some embodiments, process 800 can receive the updated metadata using any suitable technique or combination of techniques, such as techniques described above in connection with 412 of FIG. 4.

At 812, process 800 can provide at least a portion of the updated metadata to the trained DNN for analysis. In some embodiments, process 800 can generate features to be used as input to the DNN using any suitable technique or combination of techniques, such as techniques described above in connection with 406 of FIG. 4.

At 814, process 400 can receive output from the trained DNN indicative of the predicted demand (and/or increase in demand) for at least a portion of the user's origin resources. For example, as described above in connection with FIGS. 4 and 5, the DNN can provide an output that is indicative of how much a particular content item is likely to increase demand for origin resources.

At 816, process 800 can cause the amount of resources dedicated to the user's origin to be augmented based on the predicted increase in requests expected at the origin server. In some embodiments, process 800 can cause the amount of resources to be scaled using any suitable technique or combination of techniques, such as techniques described above in connection with 230 of FIG. 2, 416 of FIG. 4, and FIG. 5.

At 818, process 800 can receive updated metadata corresponding to demand for at least the portion of the user's origin subsequent to the scaling of origin resources by process 800.

At 820, process 800 can provide feedback to the trained DNN to further train the DNN. For example, if the DNN is implemented using reinforcement learning techniques, process 800 can provide a reward (and/or penalty) based on how accurate the prediction by the DNN was.

Figure 9:
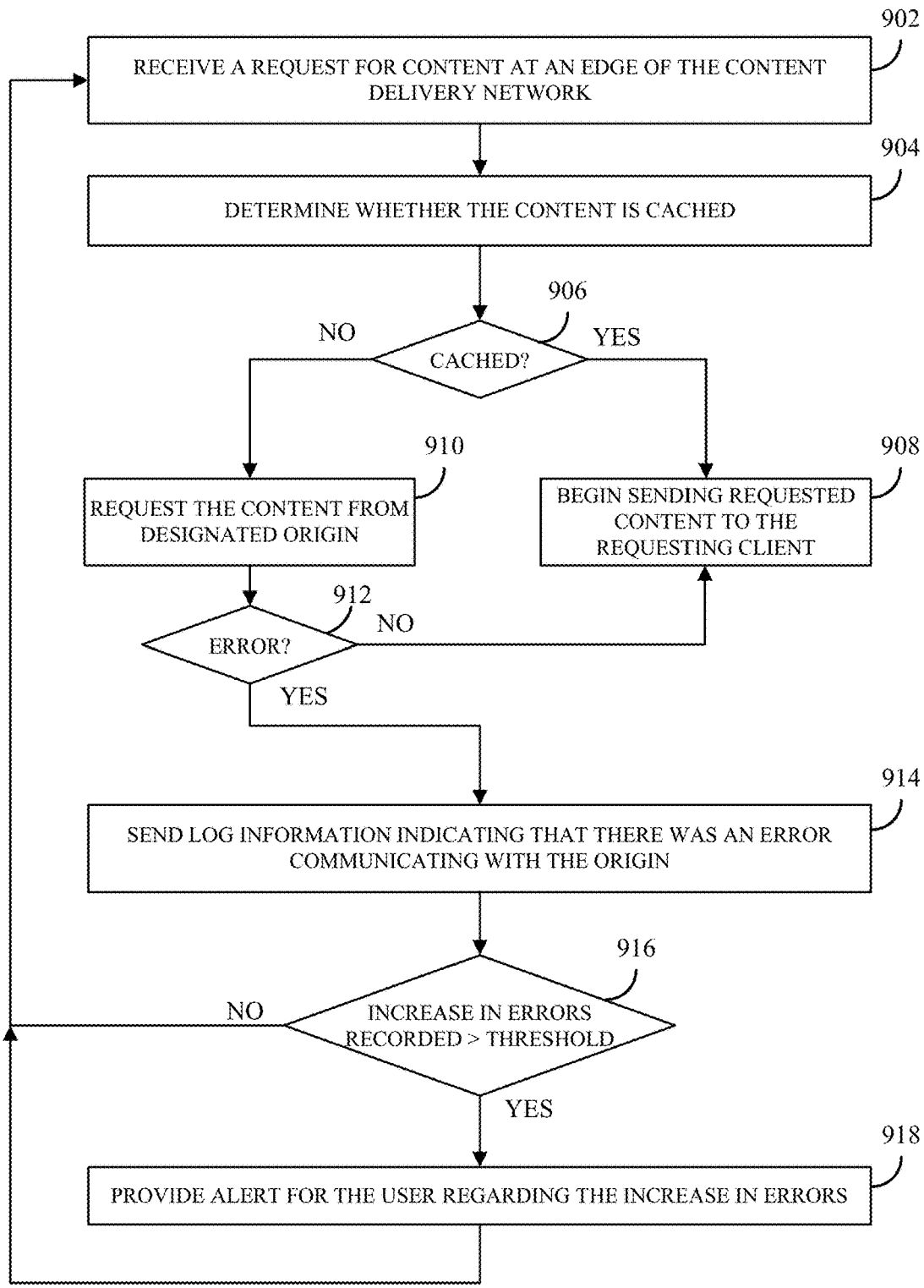
FIG. 9 is an example of a process for providing an alert indicating an increase in errors communicating with user resources dedicated to serving content to a content delivery network in accordance with some embodiments of the disclosed subject matter.

FIG. 9 depicts an example of a process 900 for providing an alert indicating an increase in errors communicating with user resources dedicated to serving content to a content delivery network in accordance with some embodiments of the disclosed subject matter. As shown in FIG. 9, at 902, process 900 can receive a request for content from a client device at a selected edge server of a content delivery network (e.g., content delivery edge 102). In some embodiments, process 900 can receive the request at a particular edge server using any suitable technique or combination of techniques, such as techniques described above in connection with 602 of FIG. 6.

At 904, process 900 can determine whether the requested content is cached using any suitable technique or combination of techniques, such as techniques described above in connection with 606 of FIG. 6.

If process 900 determines that the content is cached ("YES" at 906), process 900 can move to 908 and can send the requested content to the client device. Otherwise, if process 900 determines that the content is not cached ("NO" at 906), process 900 can move to 910 and can send a request for the content to the origin.

If process 900 receives the content (or a reply indicating that an expired cached version of the content is the newest version) from the origin ("NO" at 912), process 900 can move to 908. Otherwise, if process 900 does not receive an appropriate response from the origin ("YES" at 912), process 900 can move to 914 and can send log information indicating that there was an error communicating with the origin.

At 916, process 900 can determine whether the number of communication errors that have been recorded are higher than the average errors by a threshold amount. For example, if the simple moving average of errors between 10 and 11 AM is 7 per minute for a particular user, and 11 errors are observed during that time period, process 900 can determine that the increase in the error rate has exceeded the threshold (e.g., a 50% increase threshold can be set).

If process 900 determines that the observed error rate has not increased by at least the threshold amount ("NO" at 916), process 900 can return to 902. Otherwise, if process 900 determines that the observed error rate has increased by at least the threshold amount ("YES" at 916), process 900 can move to 918 to generate an alert with information about the increased error rate. In some embodiments, a user can subscribe to such alerts, and/or the alert can be made accessible to the user if the user has not subscribed to the alert (e.g., through a user interface associated with the content delivery network service).

Figure 10:
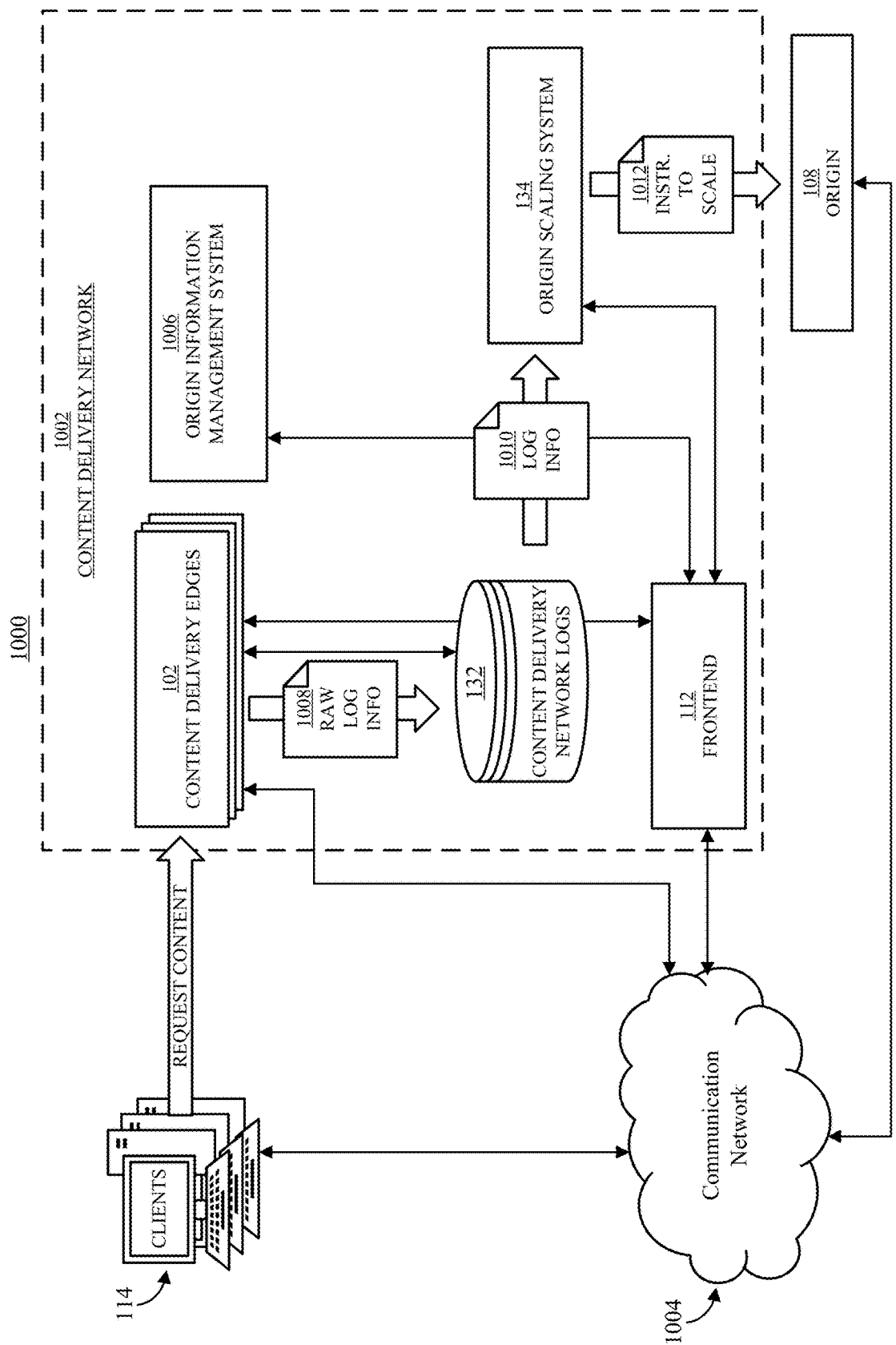
FIG. 10 is an example of a system for caching content from a user's origin resources, serving content to end user devices via a content delivery network, and automatically augmenting user resources dedicated to serving content to a content delivery network in accordance with some embodiments of the disclosed subject matter.

FIG. 10 depicts an example of a system 1000 for caching content from a user's origin resources, serving content to end user devices via a content delivery network, and automatically augmenting user resources dedicated to serving content to a content delivery network in accordance with some embodiments of the disclosed subject matter. As shown in FIG. 10, client devices (e.g., client device 114) can request content from origin 108 via a content delivery network 1002. For example, as described above in connection with FIG. 1, a DNS server can route a request for content that is available via content delivery network 1002 to the content delivery network edge (e.g., content delivery edge 102) that is best able to serve the request (based on any suitable criterion or criteria). Note that, although content delivery network log repository 132 is shown as being part of content delivery network 1002, this is merely an example, and content delivery network log repository 132 can be provided as part of another system or service.

In some embodiments, client devices can send requests for content using a communication network 1004. In some embodiments, communication network 1004 can be any suitable wired network, wireless network, any other suitable network, or any suitable combination thereof. Additionally, communication network 1004 can be any suitable personal area network, local area network, wide area network, over-the-air broadcast network (e.g., for radio or television), cable network, satellite network, cellular telephone network, any other suitable type of network, or any suitable combination thereof. For example, communication network 1004 can include a publicly accessible network of linked networks, in some cases operated by various distinct parties, such as the Internet. In some embodiments, communication network 1004 can include a private or semi-private network, such as a corporate or university intranet. Additionally, in some embodiments, communication network 1004 can include one or more wireless networks, such as a Global System for Mobile Communications (GSM) network, a Code Division Multiple Access (CDMA) network, a Long Term Evolution (LTE) network, any other suitable wireless network, or any suitable combination of wireless networks. Communication network 1004 can use any suitable protocols and/or components for communicating via the Internet and/or any of the other aforementioned types of networks. For example, communication network 1004 can use one or more protocols or combinations or protocols, such as Hypertext Transfer Protocol (HTTP), HTTPS, Message Queue Telemetry Transport (MQTT), Constrained Application Protocol (CoAP), etc.

In some embodiments, a user can submit origin information (e.g., origin information 110 described above in connection with FIG. 1) to content delivery network 1002 via frontend 112, and content delivery network can manage received origin information using an origin information management system 1006. For example, origin information management system 1006 can store origin information for each user, can distribute the origin information to each content delivery network edge, can update origin information based on instructions from a user, etc.

In some embodiments, when an edge (e.g., content delivery edge 102) received a request for content, the edge can generate raw log information 1008 about the response to the request. For example, as described above in connection with FIG. 1, an edge can generate log information indicating whether the requested content was cached at the edge (e.g., whether the request results in a cache hit or cache miss, or some other result, such as an error, a refresh hit, etc.). As another example, edges can generate log information that can be used to calculate latency, throughput, and other metrics.

In some embodiments, edges can direct log information to content delivery network log repository 132, which can be used to store and/or organize log information. For example, log information can be organized based on the user associated with the content, such that the user can view the cache hit rate, latency in serving content, throughput, etc., of content delivery network in delivering the user's content.

In some embodiments, processed log information 1010 (e.g., one or more metrics generated from the raw log information) can be sent to origin scaling system 134. As described above in connection with, for example, FIG. 1, origin scaling system 134 can determine whether origin resources for a particular user should be scaled (e.g., up or down) based on an anticipated (or present) increase in the number (or rate) of cache misses.

In some embodiments, origin scaling system 134 can send instructions 1012 (e.g., via frontend 112) to a service providing the compute resources to implement origin server 108 associated with a particular user to increase the amount of resources dedicated to providing access to content associated with origin server 108.

Figure 11:
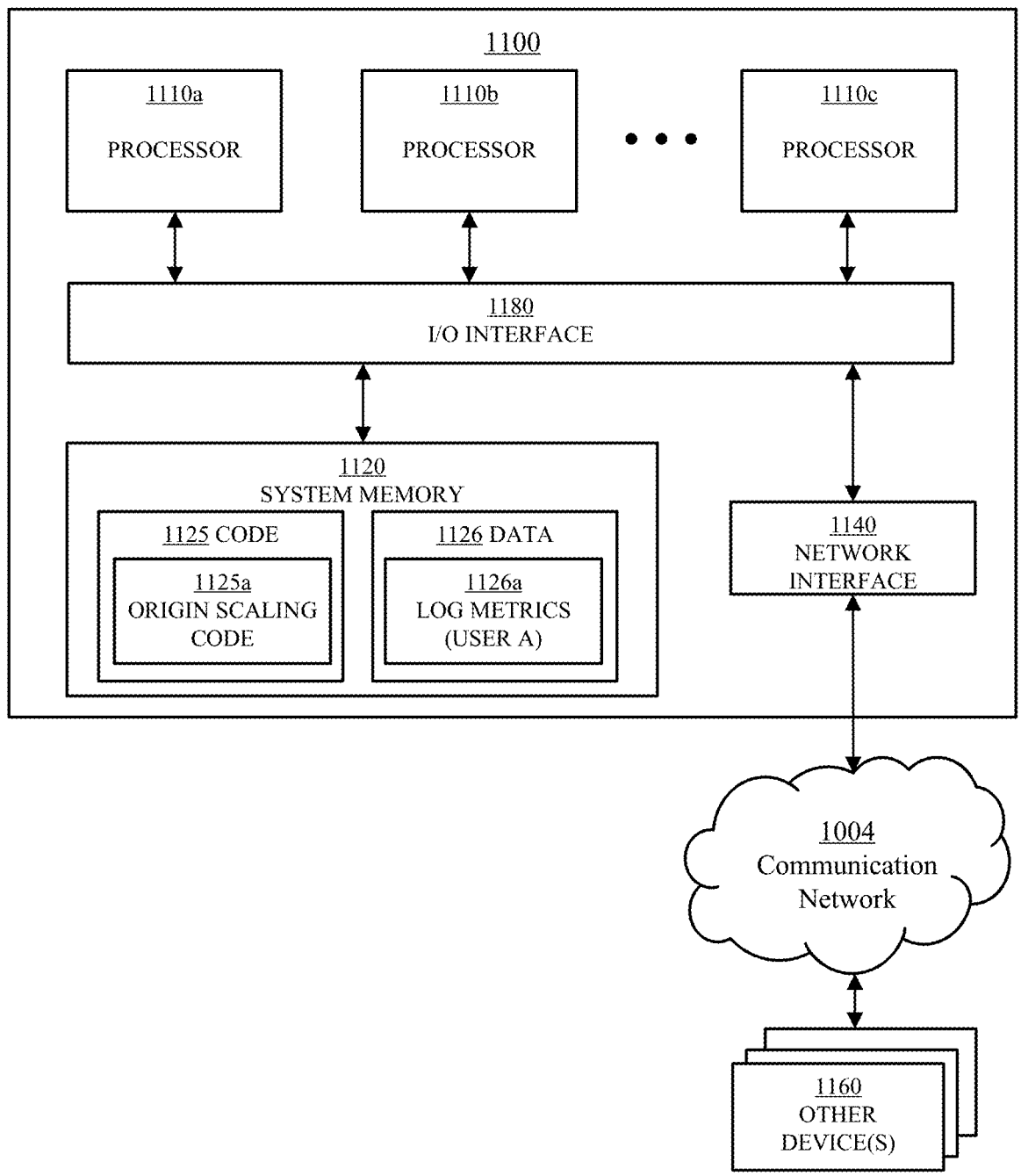
FIG. 11 is a block diagram depicting functional components of a general-purpose computing device that can be used to implement at least a portion of the mechanisms described herein in accordance with some embodiments of the disclosed subject matter.

FIG. 11 is a block diagram depicting functional components of a general-purpose computing device 1100 that can be used to implement at least a portion of the mechanisms described herein in accordance with some embodiments of the disclosed subject matter. In at least some embodiments, a computing device that implements a portion or all of one or more of the technologies described herein, including the techniques to implement the functionality of a system for automatically scaling an origin in anticipation of an increase in cache misses can include a general purpose computer system that includes or is configured to access one or more computer-accessible media. For example, origin server 108, content delivery network log repository 132, and/or origin scaling system 134 can be implemented using one or more portions of system 1100. As shown in FIG. 11, computing device 1100 can include one or more processors 1110a, 1110b, and/or 1110n (which may be referred herein singularly as "processor 1110" or in the plural as "processors 1110") coupled to system memory 1120 via an input/output (I/O) interface 1180. Computing device 1100 can further include a network interface 1140 coupled to I/O interface 1180.

In some embodiments, computing device 1100 may be a uniprocessor system including one processor 1110 or a multiprocessor system including several processors 1110 (e.g., two, four, eight, or another suitable number). Processors 1110 can be any suitable processor(s) capable of executing instructions. For example, in various embodiments, processors 1110 can be general-purpose or embedded processors implementing any of a variety of instruction set architectures (ISAs), such as the x86, Power PC, SPARC, or MIPS ISAs, or any other suitable ISA. In multiprocessor systems, each of processors 1110 can commonly, but not necessarily, implement the same ISA.

System memory 1120 can be configured to store instructions and data accessible by processor(s) 1110. In some embodiments, system memory 1120 can be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and/or data described above, are shown stored within system memory 1120 as code 1125 and data 1126. For example, code 1125 can include code for executing one or more of processes 600-900 described above in connection with FIGS. 6 to 9. As another example, code 1125 can include origin scaling code 1125a that can be used to implement origin scaling system 134. As yet another example, code 1125 can include code that can be used to implement origin server 108. As still another example, data 1126 can include log metrics 1126a associated with a particular user and/or origin (e.g., User A) received from a content delivery network log repository (e.g., content delivery network log repository 132).

In some embodiments, I/O interface 1180 can be configured to coordinate I/O traffic between processor(s) 1110, system memory 1120, and any peripheral devices in computing device 1100, including network interface 1140 or other peripheral interfaces. In some embodiments, I/O interface 1180 can perform any necessary protocol, timing, or other data transformations to convert data signals from one component (e.g., system memory 1120) into a format suitable for use by another component (e.g., processor 1110). In some embodiments, I/O interface 1180 may include support for devices attached through various types of peripheral buses, such as a variant of the Peripheral Component Interconnect (PCI) bus standard or the Universal Serial Bus (USB) standard, for example. In some embodiments, the function of I/O interface 1180 can be split into two or more separate components, such as a north bridge and a south bridge, for example. Also, in some embodiments some or all of the functionality of I/O interface 1180, such as an interface to system memory 1120, can be incorporated directly into processor 1110.

Network interface 1140 can be configured to allow data to be exchanged between computing device 1100 and other device or devices 1160 in communication with communication network 1004, such as other computer systems or devices as illustrated in FIGS. 1-3, and 10, for example. In some embodiments, network interface 1140 can support communication via any suitable wired or wireless general data networks, such as types of Ethernet networks, for example. Additionally, network interface 1140 can support communication via telecommunications/telephony networks, such as analog voice networks or digital fiber communications networks, via storage area networks, such as Fiber Channel SANs, or via any other suitable type of network and/or protocol.

In some embodiments, system memory 1120 can be any suitable computer-accessible medium configured to store program instructions and data for implementing embodiments of the present methods and apparatus. Additionally or alternatively, in some embodiments, program instructions and/or data may be received, sent or stored upon different types of computer-accessible media. In general, a computer-accessible medium can any include non-transitory storage media or memory media, such as magnetic or optical media, e.g., disk or DVD/CD coupled to computing device 1100 via I/O interface 1180. A non-transitory computer-accessible storage medium may also include any volatile or non-volatile media, such as RAM (e.g., SDRAM, DDR SDRAM, RDRAM, SRAM, etc.), ROM, etc., that can be included in some embodiments of computing device 1100 as system memory 1120, or another type of memory. Further, a computer-accessible medium can include transmission media or signals such as electrical, electromagnetic or digital signals, conveyed via a communication medium such as a network and/or a wireless link, such as can be implemented via network interface 1140. In some embodiments, portions or all of multiple computing devices, can be used to implement the mechanisms described herein; for example, software components running on a variety of different devices and servers can collaborate to provide the functionality. In some embodiments, portions of the mechanisms described herein can be implemented using storage devices, network devices, or special purpose computer systems, in addition to, or in lieu of, being implemented using general purpose computer systems (e.g., computing device 1100). The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of client devices can be termed a provider network. Such a provider network can include numerous data centers hosting various resource pools, such as collections of physical and/or virtualized computer servers, storage devices, networking equipment, and the like, needed to implement and distribute the infrastructure and services offered by the provider network. The resources can, in some embodiments, be offered to customers in units called instances, such as virtual or physical computing instances or storage instances. A virtual computing instance may, for example, include one or more servers with a specified computational capacity (which can be specified by indicating the type and number of CPUs, the main memory size, etc.) and a specified software stack (e.g., a particular version of an operating system, which can in turn run on top of a hypervisor).

A number of different types of computing devices can be used singly or in combination to implement the resources of the provider network in different embodiments, including general-purpose and/or special-purpose computer servers, storage devices, network devices, and the like. In some embodiments, a customer or user can be provided direct access to a resource instance (e.g., by giving a user an administrator login and password). Additionally or alternatively, in some embodiments, the provider network operator can allow customers to specify execution requirements for specified customer applications and schedule execution of the applications on behalf of the customer on execution platforms (such as application server instances, Java™ virtual machines (JVMs), general purpose or special purpose operating systems, platforms that support various interpreted or compiled programming languages, such as Ruby, Perl, Python, C, C++, and the like, or high performance computing platforms) suitable for the applications, without, for example, requiring the customer to access an instance or an execution platform directly. A given execution platform can utilize one or more resource instances in some implementations; in other implementations multiple execution platforms can be mapped to a single resource instance.

In many environments, operators of provider networks that implement different types of virtualized computing, storage, and/or other network-accessible functionality can allow customers to reserve or purchase access to resources in various resource acquisition modes. The computing resource provider can provide facilities for customers to select and launch the desired computing resources, deploy application components to the computing resources, and maintain an application executing in the environment. In addition, the computing resource provider can provide further facilities for the customer to quickly and easily scale up or scale down the numbers and types of resources allocated to the application, either manually or through automatic scaling, as demand for or capacity requirements of the application change. The computing resources provided by the computing resource provider can be made available in discrete units, which can be referred to as instances. An instance can, for example, represent a physical server hardware platform, a virtual machine instance executing on a server, or some combination of the two. Various types and configurations of instances can be made available, including different sizes of resources executing different operating systems (sometimes referred to as an OS) and/or hypervisors and with various installed software applications, runtimes, and the like. Instances can further be available in specific availability zones, representing a data center or other geographic location of the underlying computing hardware, for example.

In some embodiments the provider network can be organized into a plurality of geographical regions, and each region can include one or more availability zones. An availability zone (which can also be referred to as an availability container) in turn can include one or more distinct locations or data centers, configured in such a way that the resources in a given availability zone can be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Customers can be able to protect their applications from failures at a single location by launching multiple application instances in respective availability zones. At the same time, in some implementations, inexpensive and low latency network connectivity can be provided between resource instances that reside within the same geographical region (and network transmissions between resources of the same availability zone may be even faster).

The provider network can make instances available "on-demand," allowing a customer to select a number of instances of a specific type and configuration (e.g. size, platform, tenancy, availability zone, and the like) and quickly launch the instances for deployment. On-demand instances can further be added or removed as needed, either manually or automatically through auto scaling, as demand for or capacity requirements change over time. The customer can incur ongoing usage costs related to their on-demand instances, based on the number of hours of operation and/or the actual resources utilized, for example.

The computing resource provider can also make reserved instances available to the customer. Reserved instances can provide the customer with the ability to reserve a number of a specific type and configuration of instances for a fixed term, such as one year or three years, for a low, up-front cost in exchange for reduced hourly or other usage costs, for example, if and when the instances are launched. This can allow the customer to defer costs related to scaling up the deployed application in response to increase in demand, while ensuring that the right resources will be available when needed. While reserved instances provide customers with reliable, stand-by capacity for scaling of their application, purchasing reserved instances can also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks can in some cases implement a flexible set of resource reservation, control, and access interfaces for their customers. For example, a resource manager of the provider network can implement a programmatic resource reservation interface (e.g., via a web site or a set of web pages) that allows customers to learn about, select, purchase access to and/or reserve resource instances. In some embodiments described below where an entity, such as a resource manager or a pricing optimizer, is described as implementing one or more programmatic interfaces, such as a web page or an API, an interface manager subcomponent of that entity can be responsible for the interface-related functionality. In some embodiments, equivalent interface-related functionality can be implemented by a separate or standalone interface manager, external to the resource manager. Such an interface can include capabilities to allow browsing of a resource catalog and details and specifications of the different types or sizes of resources supported and the different reservation types or modes supported, pricing models, and so on.

Figure 12:
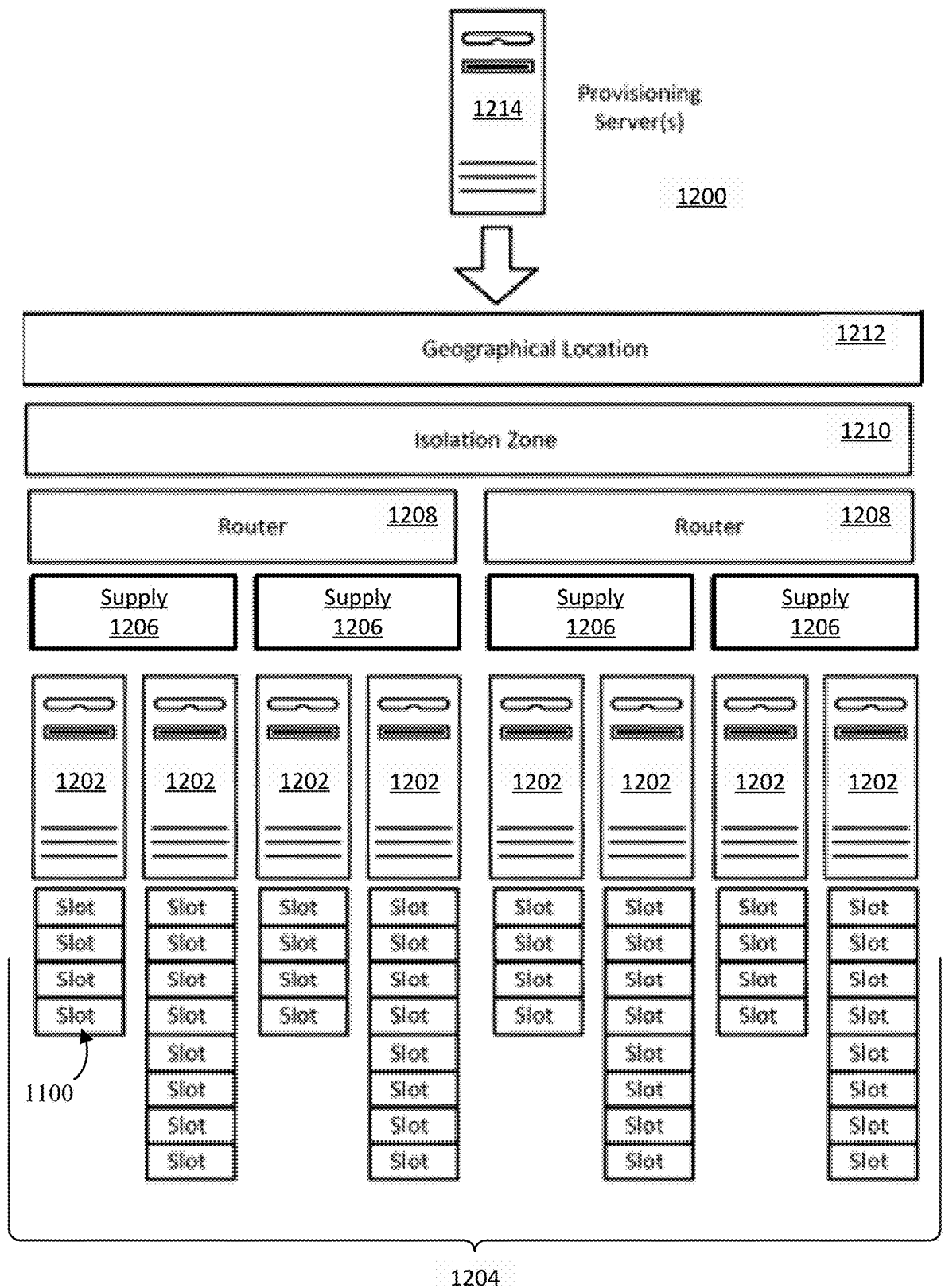
FIG. 12 is a block diagram depicting functional components of a data center that can be used to implement at least a portion of the mechanisms described herein in accordance with some embodiments of the disclosed subject matter.

FIG. 12 is a block diagram depicting functional components of a data center that can be used to implement at least a portion of the mechanisms described herein in accordance with some embodiments of the disclosed subject matter. In some embodiments, a data center 1200 can be viewed as a collection of shared computing resources and/or shared infrastructure. For example, origin server 108, content delivery network log repository 132, and/or origin scaling system 134 can be implemented using one or more portions of data center 1200. For example, as shown in FIG. 12, data center 1200 can include virtual machine slots 1204, physical hosts 1202, power supplies 1206, routers 1208, isolation zone 1210, and geographical location 1212. A virtual machine slot 1204 can be referred to as a slot or as a resource slot. A physical host 1202 can be shared by multiple virtual machine slots 1204, each slot 1204 being capable of hosting a virtual machine, such as a guest domain. In some embodiments, general-purpose computing device 1100 can be implemented using one or more slots 1204. Multiple physical hosts 1202 can share a power supply 1206, such as a power supply 1206 provided on a server rack. A router 1208 can service multiple physical hosts 1202 across several power supplies 1206 to route network traffic. An isolation zone 1210 can service many routers 1208, isolation zone 1210 being a group of computing resources that can be serviced by redundant resources, such as a backup generator. Isolation zone 1210 can reside at a geographical location 1212, such as data center 1200. A provisioning server 1214 can include memory and a processor configured with instructions to analyze user data and rank available implementation resources using determined roles and shared resources/infrastructure in the calculation. Provisioning server 1214 can also manage workflows for provisioning and deprovisioning computing resources as well as detecting health and/or failure of computing resources.

In some embodiments, provisioning server 1214 can determine a placement of the resource within the data center. In some embodiments, this placement can be based at least in part on available computing resources and/or relationships between computing resources. In some embodiments, the distance between resources can be measured by the degree of shared resources. This distance can be used in the ranking of resources according to role. For example, a first system on a host 1202 that shares a router 1208 with a second system can be more proximate to the second system than to a third system only sharing an isolation zone 1210. Depending on an application, it may be desirable to keep the distance low to increase throughput or high to increase durability. In some embodiments, the distance can be defined in terms of unshared resources. For example, two slots 1204 sharing a router 1208 can have a distance of a physical host 1202 and a power supply 1206. Each difference in resources cab be weighted differently in a distance calculation.

A placement calculation can also be used when selecting a prepared resource to transfer to a customer account. In one embodiment, a customer requests a virtual machine having an operating system. Provisioning server 1214 can determine that the request can be satisfied with a staged volume in a slot 1204. A placement decision can be made that determines which infrastructure may be desirable to share and which infrastructure is undesirable to share. Using the placement decision, a staged volume that satisfies at least some of the placement decision characteristics can be selected from a pool of available resources. For example, a pool of staged volumes can be used in a cluster computing setup. When a new volume is requested, provisioning server 1214 can determine that a placement near other existing volumes is desirable for latency concerns. Accordingly, the decision can find that sharing a router 1208 is desirable but sharing a supply 1206 and physical host 1202 is undesirable. A volume in the pool can then be selected that matches these attributes and placed preferably on a same router 1208 as the other volumes but not the same physical host 1202 or power supply 1206. In other examples of placement decisions, such as those relating to a database shard, sharing of infrastructure may be less desirable and a volume can be selected that has less infrastructure in common with other related volumes.

In accordance with some embodiments of the disclosed subject matter, a system is provided, the system comprising one or more hardware computing devices having a processor and memory storing specific computer-executable instructions that, when executed by the processor, cause the system to: obtain, at an edge server of a content delivery network, information identifying an origin server associated with a first user, wherein the origin server is implemented using an electronic data storage service to store a plurality of video files; obtain, at the edge server, a request for a first video from a first client device; determine that the first video is not cached by the edge server; in response to determining that the first video is not cached by the edge server, request the first video from the origin server based on the information identifying the origin server; in response to determining that the first video is not cached by the edge server, send first log information to a content delivery network log repository indicating a cache miss for the first video; obtain the first video from the origin server; in response to receiving the first video from the origin server, send the first video to the first client device; obtain, at the edge server, a request for a second video from a second client device; determine that the second video is cached by the edge server; in response to determining that the second video is cached by the edge server, send the second video to the second client device; in response to determining that the second video is cached by the edge server, send second log information to the content delivery network log repository indicating a cache hit for the second video; obtain a metric, based on log information sent to the content delivery network log repository, that is indicative of the volume of cache misses for videos, including the plurality of videos, associated with the origin server across a plurality of edge servers of the content delivery network; determine, based on the metric, an amount by which to scale compute resources used to implement the origin server; and send instructions to the electronic data storage service to increase the compute resources used to implement the origin server.

In some embodiments, the instructions, when executed by the processor, further cause the system to: obtain metadata associated with the first video; generate a portion of a feature vector based on the metadata associated with the first video; generate another portion of the feature vector based on the metric; provide the feature vector to a deep neural network, the deep neural network is trained to predict a change in requests for a video in a future time period of a particular length based on features corresponding to metadata associated with the video using metadata associated with videos served by the content delivery network from a plurality of origin servers; obtain, from the deep neural network, an output indicative of the predicted change in requests for the first video in a first future time period of the particular length; and determine the amount by which to scale the compute resources used to implement the origin server using the output of the deep neural network.

In some embodiments, the instructions, when executed by the processor, further cause the system to: obtain an updated metric, based on log information sent to the content delivery network log repository during the first future time period, that is indicative of the volume of cache misses for content associated with the origin server across the plurality of edge servers during the first future time period; and update the deep neural network based on a comparison of the updated metric and the predicted change in requests for the first video in the first future time period.

In accordance with some embodiments of the disclosed subject matter, a system is provided, the system comprising one or more hardware computing devices having a processor and memory storing specific computer-executable instructions that, when executed by the processor, cause the system to: obtain, from a first user associated with a first origin server, permission to instruct a service provider to augment resources dedicated to implementing the first origin server; obtain a metric, based on log information sent by edge servers of a content delivery network, indicative of a volume of requests for content items sent by the edge servers to an origin server associated with a first user during a first period of time in the past; determine, based on the metric, that the volume of requests is likely to increase during a second period of time in the future; and in response to determining that the volume of requests is likely to increase during the second period of time, instruct the service provider to increase the resources dedicated to implementing the first origin server by an amount based on a projected increase in the volume of requests during the second period of time.

In some embodiments, the instructions, when executed by the processor, further cause the system to: obtain metadata associated with content items served to the content delivery network from the first origin server; generate, for each content item, a plurality of features using the metadata; generate a feature based on the metric; provide, for each content item, the features and the feature based on the metric to a trained machine learning model that has been trained to predict a change in requests for a content item in a future period of time based on features generated from metadata associated with the content item, the deep neural network trained using metadata from a plurality of users; obtain, from the trained machine learning model, an output indicative of the predicted change in requests for each content item; and determine the amount by which to scale the compute resources used to implement the first origin server using the outputs of the trained machine learning model.

In some embodiments, the trained machine learning model comprises a deep neural network trained using at least one supervised learning techniques, wherein a label for each content item is indicative of a change in requests for that content item in a period of time following a period of time corresponding to the metadata associated with the content item.

In some embodiments, the trained machine learning model comprises a deep neural network trained using at least one reinforcement learning technique, wherein a reward metric provided to the deep neural network subsequent to a prediction for a particular content item of the content items is indicative of a change in requests for that content item in a period of time following the prediction.

In some embodiments, the plurality of features includes a first feature indicative of an author of the content item, a second feature indicative of the number of times that the content item was requested in the first period of time, and a third feature indicative of a length of the content item.

In some embodiments, the plurality of features includes a fourth feature indicative of identifying information of one or more of the following appearing in the content: a person; multiple different people; a landmark; and an object.

In some embodiments, the plurality of features includes a fifth feature indicative of a proportion of the author's content items for which an increase in requests for the content item within a predetermined time exceeded a threshold rate of increase.

In some embodiments, the plurality of users does not include the first user.

In some embodiments, the instructions, when executed by the processor, further cause the system to: obtain an updated metric, based on log information corresponding to the second time period, that is indicative of the volume of cache misses for content associated with the origin server across the plurality of edge servers during the first future time period; and update the deep neural network based on a comparison of the updated metric and the output indicative of the predicted change.

In some embodiments, the instructions, when executed by the processor, further cause the system to: in response to determining that the volume of requests is likely to increase during the second period of time, instruct each edge server of the content delivery network to inhibit serving of a most resource intensive version of a requested content item if a requested version of the content item from the first origin server is not cached; determine that the increased resources dedicated to implementing the first origin server are being used to implement the first origin server; and in response determining that the increased resources dedicated to implementing the first origin server are being used to implement the first origin server, instruct each edge server of the content delivery network to serve content from the first origin server normally.

In some embodiments, the instructions, when executed by the processor, further cause the system to: obtain information identifying the first origin server associated with the first user, wherein the first origin server is implemented using an electronic data storage service to store a plurality of video files; and send the information identifying the first origin server to each edge of the content delivery network.

In some embodiments, each of the plurality of content items includes video data.

In some embodiments, a system is provided, the system comprising one or more hardware computing devices having a processor and memory storing specific computer-executable instructions that, when executed by the processor, cause the system to: obtain, at an edge server of a content delivery network, a request for a first video from a first client device; determine, at the edge server, that the there are multiple versions of the first video that require varying amount of resources to serve to client devices including at least a first version, a second version requiring more resources to serve than the first version, and a third version requiring more resources to serve than the second version; determine, at the edge server, that the first client device is capable of rendering the third version of the first video; send, from the edge server, the third version of the first video; determine, at the edge server, that the first client device is not properly rendering the third version of the first video; in response to determining that that the first client device is not properly rendering the third version of the first video, send the first version of the first video; determine, at the edge server, that the first client device is rendering the first version of the first video; in response to determining that that the first client device is rendering the first version of the first video, send the second version of the first video; determine, at the edge server, that the first client device is not properly rendering the second version of the first video; in response to determining that that the first client device is not properly rendering the second version of the first video, send a next lowest resource intensive version of the first video; determine, at the edge server, that the first client device is rendering the next lowest resource intensive version of the first video; and in response to determining that the first client device is rendering the next lowest second version of the first video, continue to send the next least resource intensive version.

In some embodiments, the first version of the video is the lowest quality version of the video.

In some embodiments, the instructions, when executed by the processor, further cause the system to: determine that the third version of the first video is not cached by the edge server; in response to determining that the first video is not cached by the edge server, request the first video from a video processing service that obtained the first video from the origin server.

Although subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It should be understood that the above described steps of the processes of FIGS. 6 to 9 can be executed or performed in any order or sequence not limited to the order and sequence shown and described in the figures. Also, some of the above steps of the processes of FIGS. 6 to 9 can be executed or performed substantially simultaneously where appropriate or in parallel to reduce latency and processing times.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising one or more hardware computing devices having a processor and memory storing specific computer-executable instructions that, when executed by the processor, cause the system to:
    obtain, at an edge server of a content delivery network, information identifying an origin server associated with a first user, wherein the origin server is implemented using an electronic data storage service to store a plurality of video files;
    obtain, from the first user associated with the origin server, permission to instruct a service provider to augment resources dedicated to implementing the origin server;
    obtain, at the edge server, a request for a first video from a first client device;
    determine that the first video is not cached by the edge server;
    in response to determining that the first video is not cached by the edge server, request the first video from the origin server based on the information identifying the origin server;
    in response to determining that the first video is not cached by the edge server, send first log information to a content delivery network log repository indicating a cache miss for the first video;
    obtain the first video from the origin server;
    in response to receiving the first video from the origin server, send the first video to the first client device;
    obtain, at the edge server, a request for a second video from a second client device;
    determine that the second video is cached by the edge server;
    in response to determining that the second video is cached by the edge server, send the second video to the second client device;
    in response to determining that the second video is cached by the edge server, send second log information to the content delivery network log repository indicating a cache hit for the second video;
    obtain a metric, based on log information sent to the content delivery network log repository, that is indicative of the volume of cache misses for videos, including the plurality of videos, associated with the origin server across a plurality of edge servers of the content delivery network;
    determine, based on the metric, that the volume of cache misses for videos associated with the origin server is likely to increase during a second period of time in the future;
    determine, based on the metric, an amount by which to scale compute resources used to implement the origin server; and
    send instructions to the electronic data storage service to increase the compute resources used to implement the origin server.

2. The system of claim 1, wherein the instructions, when executed by the processor, further cause the system to:
    obtain metadata associated with the first video;
    generate a portion of a feature vector based on the metadata associated with the first video;
    generate another portion of the feature vector based on the metric;
    provide the feature vector to a deep neural network, the deep neural network is trained to predict a change in requests for a video in a future time period of a particular length based on features corresponding to metadata associated with the video using metadata associated with videos served by the content delivery network from a plurality of origin servers;
    obtain, from the deep neural network, an output indicative of the predicted change in requests for the first video in a first future time period of the particular length; and
    determine the amount by which to scale the compute resources used to implement the origin server using the output of the deep neural network.

3. The system of claim 2, wherein the instructions, when executed by the processor, further cause the system to:
    obtain an updated metric, based on log information sent to the content delivery network log repository during the first future time period, that is indicative of the volume of cache misses for content associated with the origin server across the plurality of edge servers during the first future time period; and
    update the deep neural network based on a comparison of the updated metric and the predicted change in requests for the first video in the first future time period.

4. A system, comprising one or more hardware computing devices having a processor and memory storing specific computer-executable instructions that, when executed by the processor, cause the system to:
    obtain, from a first user associated with a first origin server, permission to instruct a service provider to augment resources dedicated to implementing the first origin server;
    obtain a metric, based on log information sent by edge servers of a content delivery network, indicative of a volume of requests for content items sent by the edge servers to an origin server associated with a first user during a first period of time in the past;
    determine, based on the metric, that the volume of requests is likely to increase during a second period of time in the future; and
    in response to determining that the volume of requests is likely to increase during the second period of time, instruct the service provider to increase the resources dedicated to implementing the first origin server by an amount based on a projected increase in the volume of requests during the second period of time.

5. The system of claim 4, wherein the instructions, when executed by the processor, further cause the system to:

obtain metadata associated with content items served to the content delivery network from the first origin server;

generate, for each content item, a plurality of features using the metadata;

generate a feature based on the metric;

provide, for each content item, the features and the feature based on the metric to a trained machine learning model that has been trained to predict a change in requests for a content item in a future period of time based on features generated from metadata associated with the content item, the trained machine learning model trained using metadata from a plurality of users;

obtain, from the trained machine learning model, an output indicative of the predicted change in requests for each content item; and determine the amount by which to scale the compute resources used to implement the first origin server using the outputs of the trained machine learning model.

6. The system of claim 5, wherein the trained machine learning model comprises a deep neural network trained using at least one supervised learning techniques, wherein a label for each content item is indicative of a change in requests for that content item in a period of time following a period of time corresponding to the metadata associated with the content item.

7. The system of claim 5, wherein the trained machine learning model comprises a deep neural network trained using at least one reinforcement learning technique, wherein a reward metric provided to the deep neural network subsequent to a prediction for a particular content item of the content items is indicative of a change in requests for that content item in a period of time following the prediction.

8. The system of claim 5, wherein the plurality of features includes a first feature indicative of an author of the content item, a second feature indicative of the number of times that the content item was requested in the first period of time, and a third feature indicative of a length of the content item.

9. The system of claim 8, wherein the plurality of features includes a fourth feature indicative of identifying information of one or more of the following appearing in the content: a person; multiple different people; a landmark; and an object.

10. The system of claim 8, wherein the plurality of features includes a fifth feature indicative of a proportion of the author's content items for which an increase in requests for the content item within a predetermined time exceeded a threshold rate of increase.

11. The system of claim 5, wherein the plurality of users does not include the first user.

12. The system of claim 11, wherein the instructions, when executed by the processor, further cause the system to:
obtain an updated metric, based on log information corresponding to the second time period, that is indicative of the volume of cache misses for content associated with the origin server across the plurality of edge servers during the first future time period; and update the trained machine learning model based on a comparison of the updated metric and the output indicative of the predicted change.

13. The system of claim 4, wherein the instructions, when executed by the processor, further cause the system to:
in response to determining that the volume of requests is likely to increase during the second period of time, instruct each edge server of the content delivery network to inhibit serving of a most resource intensive version of a requested content item if a requested version of the content item from the first origin server is not cached;

determine that the increased resources dedicated to implementing the first origin server are being used to implement the first origin server; and in response determining that the increased resources dedicated to implementing the first origin server are being used to implement the first origin server, instruct each edge server of the content delivery network to serve content from the first origin server normally.

14. The system of claim 4, wherein the instructions, when executed by the processor, further cause the system to:
obtain information identifying the first origin server associated with the first user, wherein the first origin server is implemented using an electronic data storage service to store a plurality of video files; and send the information identifying the first origin server to each edge of the content delivery network.

15. The system of claim 4, wherein each of the plurality of content items includes video data.

16. A method, comprising:
obtaining, from a first user associated with a first origin server, permission to instruct a service provider to augment resources dedicated to implementing the first origin server;

obtaining a metric, based on log information sent by edge servers of a content delivery network, indicative of a volume of requests for content items sent by the edge servers to an origin server associated with a first user during a first period of time in the past;

determining, based on the metric, that the volume of requests is likely to increase during a second period of time in the future; and in response to determining that the volume of requests is likely to increase during the second period of time, instructing the service provider to increase the resources dedicated to implementing the first origin server by an amount based on a projected increase in the volume of requests during the second period of time.

17. The method of claim 16, further comprising:
obtaining metadata associated with content items served to the content delivery network from the first origin server;

generating, for each content item, a plurality of features using the metadata;

generating a feature based on the metric;

providing, for each content item, the features and the feature based on the metric to a trained machine learning model that has been trained to predict a change in requests for a content item in a future period of time based on features generated from metadata associated with the content item, the trained machine learning model trained using metadata from a plurality of users;

obtaining, from the trained machine learning model, an output indicative of the predicted change in requests for each content item; and determining the amount by which to scale the compute resources used to implement the first origin server using the outputs of the trained machine learning model.

18. The method of claim 17, wherein the plurality of features includes a first feature indicative of an author of the content item, a second feature indicative of the number of times that the content item was requested in the first period of time, and a third feature indicative of a length of the content item.

19. The method of claim 16, further comprising:
in response to determining that the volume of requests is likely to increase during the second period of time, instructing each edge server of the content delivery network to inhibit serving of a most resource intensive version of a requested content item if a requested version of the content item from the first origin server is not cached;
determining that the increased resources dedicated to implementing the first origin server are being used to implement the first origin server; and
in response determining that the increased resources dedicated to implementing the first origin server are being used to implement the first origin server, instructing each edge server of the content delivery network to serve content from the first origin server normally.

20. The method of claim 16, further comprising:
obtaining information identifying the first origin server associated with the first user, wherein the first origin server is implemented using an electronic data storage service to store a plurality of video files; and
sending the information identifying the first origin server to each edge of the content delivery network.

* * * * *